(12) United States Patent
Tripakis et al.

(10) Patent No.: US 9,152,390 B1
(45) Date of Patent: Oct. 6, 2015

(54) GENERATING MODULAR AND HIERARCHICAL EXECUTION CODE FROM UNTIMED AND TIMED BLOCK DIAGRAMS

(75) Inventors: Stavros Tripakis, Berkeley, CA (US); Roberto Lublinerman, State College, PA (US)

(73) Assignee: Cadence Design Systems, Inc., San Jose, CA (US)

( * ) Notice: Subject to any disclaimer, the term of this patent is extended or adjusted under 35 U.S.C. 154(b) by 1929 days.

(21) Appl. No.: 11/852,149

(22) Filed: Sep. 7, 2007

(51) Int. Cl.
G06F 9/44 (2006.01)
(52) U.S. Cl.
CPC .......................................... *G06F 8/34* (2013.01)
(58) Field of Classification Search
CPC ......................................................... G06F 8/34
USPC .......................................... 717/106; 707/804
See application file for complete search history.

(56) References Cited

U.S. PATENT DOCUMENTS

2004/0210592 A1* 10/2004 Ciolfi et al. .................... 707/101
2007/0157162 A1* 7/2007 Ciolfi ............................ 717/105

OTHER PUBLICATIONS

Haiyang Zheng et al., "Leveraging Synchronous Language Principles for Hybrid System Models", 7th Biennial Ptolemy Miniconference, Feb. 13, 2007, 24 pages, Berkeley, CA.
Pascal Aubry et al., "On the Desynchronization of Synchronous Applications", International Conference on Systems Engineering (ISCE'96), Jul. 9-11, 1996, 6 pages, Las Vegas, Nevada.
Stephen A. Edwards, "Compiling Esterel into Sequential Code", ACM, Inc., pp. 322-327, 2000, Los Angeles, California.
Johan Eker et al., "Taming Heterogeneity—The Ptolemy Approach", Proceedings of the IEEE, Jan. 2003, pp. 127-144, vol. 91, No. 1.
David Berner et al., "Modular Design Through Component Abstraction", ACM, CASES'04, Sep. 22-25, 2004, 10 pages, Washington, DC, USA.
Marco Zennaro et al., "Distributing Synchronous Programs Using Bounded Queues", EMSOFT'05, Sep. 19-22, 2005, pp. 325-334, Jersey City, New Jersey, USA.
P. Aubry et al., "Synchronous Distribution of Signal Programs", HICSS-29, Jan. 1996, 10 pages, Hawaii.
Stavros Tripakis et al., "Translating Discrete-Time Simulink to Lustre", ACM Transactions on Embedded Computing Systems, Nov. 2005, pp. 779-818, vol. 4, No. 4.
Stephen Edwards et al., "The semantics and execution of a synchronous block-diagram language", Science of Computer Programming, 2003, pp. 21-42.
Olivier Hainque et al., "Cronos: A Separate Compilation Toolset for Modular Esterel Applications", Technical Paper Related to Industrial Applications, 1999, 18 pages.
Olivier Naffeis et al., "Distributed Implementation of Signal: Scheduling & Graph Clustering", 1994, 20 pages.
Stephen A. Edwards, "Compiling Esterel into Sequential Code", Synopsys, Inc., 1999, pp. 147-151, Rome Italy.
P. Caspi et al., "LUSTRE: A Declarative Language for Programming Synchronous Systems", ACM, 1987, pp. 178-188.

(Continued)

*Primary Examiner* — Alexey Shmatov
(74) *Attorney, Agent, or Firm* — Vista IP Law Group, LLP

(57) ABSTRACT

The invention is directed to a method, computer program product and apparatus for generating modular, hierarchical code from block diagram notations. The generated code for a block preserves the hierarchical structure of the block, and is independent of where this block is embedded. Therefore, code for a block need to be generated only once, and then stored and reused multiple times, each time the block is reused in a diagram.

22 Claims, 26 Drawing Sheets

(56) References Cited

OTHER PUBLICATIONS

Albert Benveniste et al., "The Synchronous Languages 12 Years Later", Proceedings of the IEEE, Jan. 2003, pp. 64-83, vol. 91, No. 1.

Albert Benveniste et al., "Compositionality in dataflow synchronous languages: specification & code generation", INRIA, Nov. 1997, 43 pages.

* cited by examiner

800

900

GENERATING MODULAR AND HIERARCHICAL EXECUTION CODE FROM UNTIMED AND TIMED BLOCK DIAGRAMS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to embedded software, and more particularly to code generation of block diagrams.

BACKGROUND

Block diagram notations may be used to design a multitude of systems that can be implemented in software, hardware, or a combination of the two. Examples of systems that can be designed using block diagrams are communication systems such as encoders/decoders, automotive control systems such as ABS or cruise controllers, avionic controllers, and many more. These block diagram notations require generating code for simulation. In the case where the system is implemented in software, code generation may also be required for execution in an embedded context such as in embedded software. Block diagrams are commonly used today for embedded software design and/or programming.

The performance of embedded software is typically measured by its system's throughput as well as by the required size of the program and data memory. Efficient analysis and treatment of the blocks increases the efficiency of the system. Each block represents a particular system function or actor. Depending upon the complexity of an actor, it could be itself represented by a number of sub-blocks. These blocks and sub-blocks can be symbolized as block diagrams. Block-diagram notations are useful for modeling different types of circuit designs.

Each block has a segment of program code associated with it, which when executed, implements the function in the system. Each block can execute (i.e., fire) at any time provided its requisite input data is available. These block diagram notations have a graphical syntax as well as some determined semantics.

Once a block-diagram is drawn, the diagram may be simulated in order to observe whether its behavior is as expected. Eventually, it is desirable to produce software that implements the diagram and execute this software in some application. This may be achieved by knowing how to generate code from a given diagram that implements the semantics of the diagram in a correct and efficient manner. Notice that simulation itself is one of the main applications of code generation: the software that implements the semantics of the diagram correctly and efficiently can be used to simulate the diagram.

Prior solutions to the code generation problem typically produce "flat" code: first, the diagram is "flattened" (i.e., remove its hierarchy to produce a diagram where all blocks are at the same level), and then, code for this flat diagram is generated. This process has a number of drawbacks. First, it involves the overhead of flattening which can be significant for a large diagram. Second, the hierarchical structure of the diagram is not preserved in the code, which means that the code is unstructured. The user has to also inspect, understand and modify the code, which is separate from the diagram. Third, modular code generation is not possible with the flattening method because the code is generated for a block depending on where this block is embedded and also what detailed knowledge is required for the sub-blocks. For example, if a block containing a sub-hierarchy is replicated twice in a diagram, the flattening procedure is typically unable to recognize this situation and will flatten the two identical blocks twice. It will also replicate the code generated for the replicated block, which means that the total generated code will be much larger and contain redundancy. Another drawback with "flattening" is that sub-blocks cannot be treated as "black boxes" during code generation, which causes intellectual property (IP), security and privacy issues.

SUMMARY

The invention avoids these shortcomings by providing methods and systems for generating modular, hierarchical code.

In one embodiment, a profile is used for each block. The profile contains essential interface information for the users of the block. It contains a set of interface functions that together implement the synchronous transition function of the block. It also contains a Profile Dependency Graph (PDG) between these interface functions that describes the correct order in which the functions should be called.

In one embodiment, the method, apparatus and medium include a classification of blocks in block-diagrams as "Moore-sequential", "non-Moore sequential" or "combinational" and algorithms to classify blocks automatically, starting from a given block diagram and a characterization of the atomic blocks. In one embodiment, this classification information assists in the "step-get" method of code generation.

Another embodiment includes an optimized version of the above classification. Each output port of a block is independently classified instead of classifying entire blocks as Moore-sequential, non-Moore sequential or combinational. The port information is used to assist in the "per-port" code generation method and "dynamic" code generation method.

In another embodiment, a dependency analysis technique that determines a "Scheduling Dependency Graph" (SDG) and uses this graph for code generation.

In another embodiment, the present invention may also provide translation techniques between two timed block diagram notations.

In another embodiment, an automata-based technique is utilized to represent the times where a block needs to be fired. Other embodiments include additional techniques to compute these times for a macro-block, by composing the automata of its sub-blocks.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

In some embodiments, the generated code for a block diagram preserves the hierarchical structure of a block of the block diagram, and is independent of where this block is embedded. Therefore, code for the same block need to be generated only once, and then stored and reused multiple times, each time the block is reused in the diagram. For example, the code is generated for a macro block independently from context, that is, independently from where the macro block is going to be used in the diagram. To realize this, the code generation scheme that may be used includes three major parts. The first part is to classify the input macro block as combinational or sequential, and if sequential as Moore-sequential or non-Moore sequential. The second part is to determine whether there exists a valid execution order of the functions of the sub-blocks of the macro block. The third part includes code generation.

Figure 1:
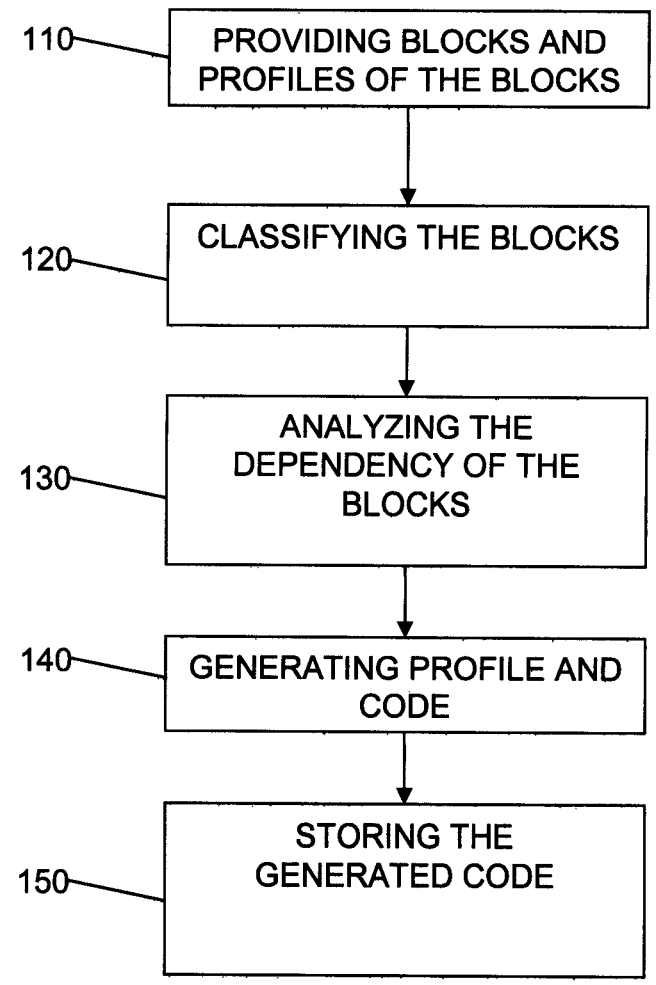
FIG. 1 depicts a generic flow diagram for generating code for block diagrams according to an embodiment of the present invention.

FIG. 1 depicts a generic flow diagram for generating modular code for block diagrams. This flow diagram represents an embodiment of the present invention for generating code from a block diagram having sub-blocks.

At 110, the block diagram with a plurality of blocks and profiles of blocks are received for generation of code for the block diagram. In one embodiment, this generation process is performed in an editor. Any software or hardware component may be used to generate this code. In another embodiment, the block diagram includes untimed block diagrams, where no firing time is specified. In a further embodiment, the block diagrams include timed block diagrams, where firing time is specified for each block in the timed block diagram. The firing time of a block specified the time instants where the block should be fired; i.e., update its output and its internal state (if any). In another embodiment, the diagram includes a combination of timed and untimed blocks.

At 120, the blocks (i.e., sub-blocks) from the block diagram are classified. In one embodiment, the blocks are classified by its function. For example, the blocks may be classified as sequential or combinational. Sequential blocks are blocks that have memory or internal state where their outputs depend on the inputs as well as their internal state. The internal state is based on the current value and the input values. Combinational blocks are blocks that are without state; i.e., given the same inputs; they always produce the same output. In another example, the blocks may be classified as "Moore-sequential", "non-Moore sequential" or "combinational." In another embodiment, the blocks are classified by their port connections. For example, the blocks may be classified by the connections from each output port of the blocks. Any classification strategy or combination of strategies may be used. In one embodiment, the code generation process performs the classification process automatically. In another embodiment, the classification process is performed with user inputs. The classification process may be performed by any desired methods.

At 130, the dependency of the block diagram is analyzed. This dependency analysis includes determining how each block is related to each other. In one embodiment, a hierarchical dependency analysis technique is used. In this technique, a scheduling dependency graph is generated and used. A scheduling dependency graph captures the dependencies between all interface functions of all blocks in the diagram. This graph may be built for diagrams with or without triggers. In another embodiment, a data-driven dependency analysis may be used. In this analysis, the dependency graph contains information on how the data values of inputs and internal variables influence the dependencies between blocks. In another embodiment, dynamic dependency graphs may be used. This type of graph captures dependencies that may change from one cycle to the next. In one embodiment with timed blocks, the dependency analysis includes determining the timing activity of the blocks when the block diagram includes timed block diagram. For example, the dependency analysis includes computing for any two sub-blocks whether they can be fired at the same cycle. In another embodiment, this analysis computes in a compact representation the sets of times that different blocks are fired and for each set of times the blocks that fire at those times. In a further embodiment, the dependency includes first computing firing time specification of the blocks. Then, a factored firing time is determined. The factored firing time of a block is obtained by dividing the firing time of the block by the firing time of its parent block. Then, the firing time specification of the block is computed. Then modulo counters are associated to factored firing time (FFT) specification.

At 140, code is generated using the classification information and dependency information. In one embodiment, the code is generated using class information of the blocks as input along with the information from the dependency analysis. In another embodiment, port information is used to assist in code generation. In a further embodiment, a dynamic method may be used where the different sub-graphs determined by the dependency analysis may share some of the nodes of the graph.

At 150, the generated code is stored for use by another program or as desired by the user. In one embodiment, the profile is generated with the code. The profile may include a list of interface functions and the profile dependency graph of the block. In another embodiment, the code may be implementations of the interface functions. In other embodiments other outputs are available.

Figure 2:
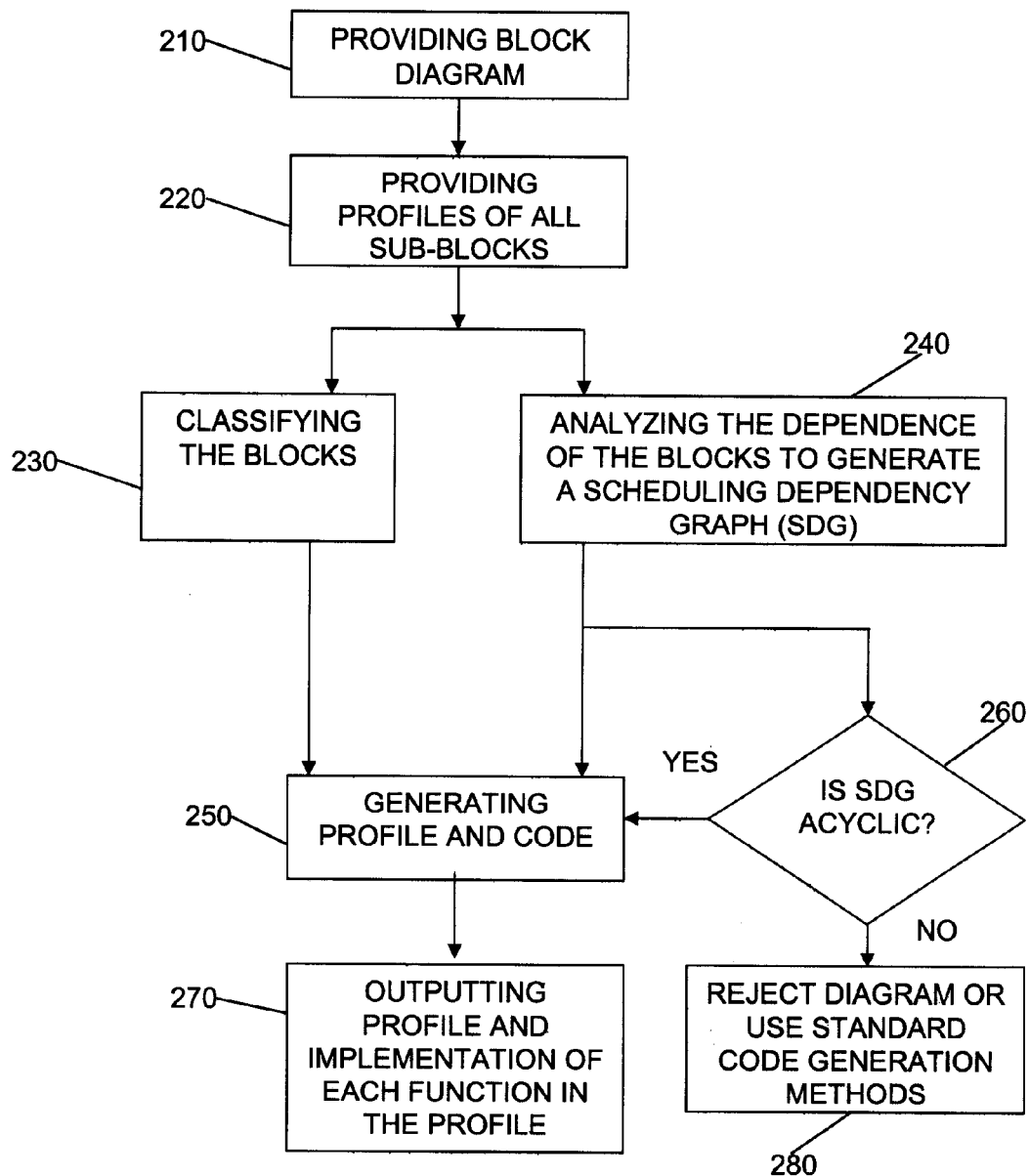
FIG. 2 depicts another flow diagram for generating code for untimed block diagrams according to an embodiment of the present invention.

FIG. 2 depicts another flow diagram for generating code for untimed block diagrams. Code generation from a block diagram is useful for different purposes, including simulation as well as execution of real-time embedded code. In some embodiments, the code generation scheme is modular and hierarchical.

At 210, one or more block diagrams having macro blocks and sub-blocks are provided to the code generator.

A plurality of blocks may be connected to form block diagrams. This may be achieved by connecting the output port of a block to the input port of another block or the same block. An output port may be connected to more than one input ports. However an input port can only be connected to a single output. A diagram is closed if all ports are connected; otherwise, it is open.

An atomic block has a number of input ports and a number of output ports. In one embodiment, the atomic block has no input ports. In another embodiment, the atomic block as no output ports. Any number of output ports is possible.

A macro block encapsulates a block diagram into a block. The blocks forming the block diagram are called the internal blocks of the macro block, or its sub-blocks. Like an atomic block, a macro block has a set of input and output ports. Upon encapsulation, each input port of the macro block is connected to one or more inputs of its internal blocks, or to an output port of the macro block. Each output port of the macro block is connected to exactly one port: either an output port of an internal block or an input of the macro block. The connections between blocks ("wires") are called signals.

Any block (e.g., atomic or macro block) may be triggered by a signal x, where x is the trigger of the block. When a block is triggered, the user has the possibility of specifying initial values for each output of that block. These initial values determine the values of the outputs during the initial period until the block is triggered for the first time.

At 220, one or more profiles related to the sub-blocks are also provided to an editor and/or code generator. In other embodiments, any apparatus or system that performs code generation may be used. Each block profile contains the necessary information for the user of a block. Both atomic and macro blocks have profiles. In one embodiment, the profile of a block contains: (1) the class of the block, whether the block is combinational, Moore-sequential or non-Moore sequential; (2) a list of functions that constitute the interface for the block, and the signature for each of these functions; (3) a profile dependency graph that describes the correct order in which these functions are to be called. The exact profile of the block may depend on the particular code generation method used.

At 230, the blocks are classified similar to block 130 of FIG. 1. Each atomic block is pre-classified as either combinational or sequential. Combinational blocks are defined to have no memory, i.e., given the same inputs; they always produce the same outputs. Sequential blocks have memory, i.e., internal state. Their outputs depend not only on their inputs but also on the internal state. The internal state is updated based on its current value and the inputs.

Some sequential atomic blocks are Moore-sequential. Each output of a Moore-sequential block only depends on the state, but not on the inputs. For example a delay element that stores the input and provides it as output in the next "cycle" is a Moore-sequential block. On the other hand, for example, an "integrator" block that outputs the sum of all inputs, including previous and current inputs, is a non-Moore-sequential block.

Macro blocks may also be classified as combinational, sequential and Moore-sequential. In an embodiment, classification may be accomplished using an automated procedure, as follows: First, classify macro-blocks as combinational or sequential (e.g., A macro block A is combinational if all its sub-blocks are combinational, otherwise it is sequential). Then, classify sequential macro-blocks as Moore-sequential or not (e.g., A sequential macro block A is Moore-sequential if every path from an output port backwards through inputs and triggers eventually "meets" the output of an internal untriggered Moore-sequential block). In some embodiments, a path is followed backwards from the output of a non Moore-sequential block through its inputs and triggers, and from the output of a Moore-sequential block through its triggers only.

At 240, an analysis of the dependence of each block and sub-block is performed to generate a scheduling dependency graph (SDG).

Different types of dependency analysis maybe used to determine the dependence of each block and sub-block. In one embodiment, the standard dependency analysis is a block-based dependency analysis. This analysis may be used after flattening a diagram, and may be for the purpose of giving semantics to the diagram. For this type of dependency analysis a block-based dependency graph is constructed. The nodes of this graph are all the blocks in the diagram. For example, for each block A that is not Moore-sequential, for each block B with some input or trigger connected to an output of A, a directed edge is added from A to B. In some embodiments, it determines whether or not a block diagram is acyclic by flattening it and building its block-based dependency graph. A block diagram is acyclic if the block-based dependency graph is acyclic.

At 250, code is generated using the classification information 230 and SDG from the analysis 240. In one embodiment, a step-get code generation in used. another embodiment, per port code generation is used. In a further embodiment, dynamic code generation is used. In further embodiments, combinations of the above methods may be used. For instance, the per port method may be used for the sub-blocks of a macro block and the dynamic method may be used for the macro block itself. Any code generation methods may be used.

At 260, a determination in made by analyzing the SDG to determine whether the graph is acyclic. In another embodiment, a determination is performed to determine whether the graph is cyclic. This determination may be performed by any known algorithm.

At 270, from the generated code, a profile and/or implementation of each function in the profile is provided. The outputs of the code generation scheme include the profile for P and the implementation (in a certain programming language such as C++, Java etc.) of each of the functions listed in the profile of P.

At 280, if the SDG is cyclic, then the block diagram cannot be used for this flow. In one embodiment, the diagram is rejected. In another embodiment, standard code generation methods are used to generate the code.

Figure 3:
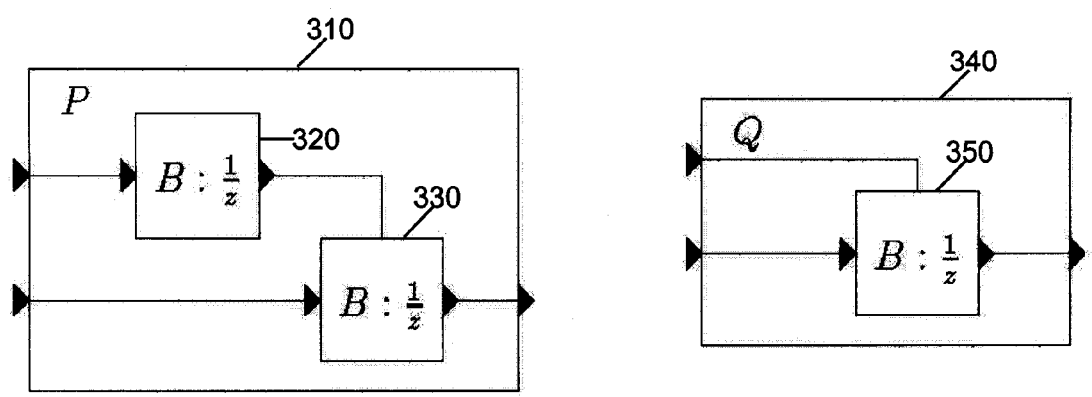
FIG. 3 illustrates a diagram with a Moore-sequential macro block P and a non-Moore sequential macro block Q according to an embodiment of the present invention.

In one embodiment, FIG. 3 illustrates a Moore macro block P and a non-Moore macro block Q having of triggers 300. Block P 310 is Moore-sequential because both its internal blocks labeled B 320, 330 are Moore-sequential and two paths from the output of P backwards towards the inputs reach these two internal blocks before reaching the inputs. Block Q 340 is not Moore-sequential because the path from its output through the trigger to block B 350 and until the upper input port does not meet the output of any Moore-sequential block.

Figure 4:
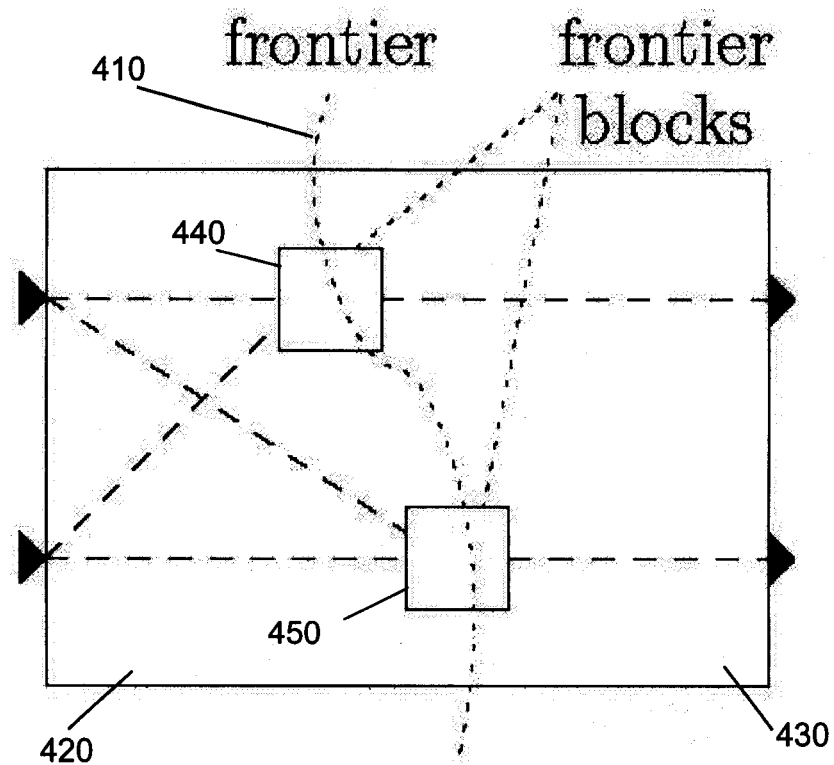
FIG. 4 illustrates an exemplary structure of a Moore-sequential macro block for an embodiment of the present invention.

FIG. 4 illustrates an exemplary structure of a Moore-sequential macro block for an embodiment of the present invention. For example, let the block A 400 in FIG. 4 be a Moore-sequential macro block. There is a "frontier" dividing the internal diagram of A 400 in two parts, a "left" 420 and a "right" 430 part. This frontier 410 is defined by the Moore-sequential blocks 440, 450 that are "met" by the backwards paths described above. These blocks are called "frontier blocks". In another embodiment, internal blocks of a Moore-sequential macro block are classified in three classes: left, right and frontier. The procedure to classify blocks as left, right or frontier includes finding all paths from each output of the macro block backwards recursively, by tracing the inputs and triggers of non Moore-sequential blocks and the triggers of Moore-sequential blocks, until inputs are reached or path stops in a frontier block. Blocks in the path are right blocks and blocks not in the path are left blocks. In some embodiments, a block with no outputs is defined to be Moore-sequential. Such a block has no paths from the outputs; thus, it has no frontier blocks and no right blocks. All its sub-blocks are left blocks.

Figure 5:
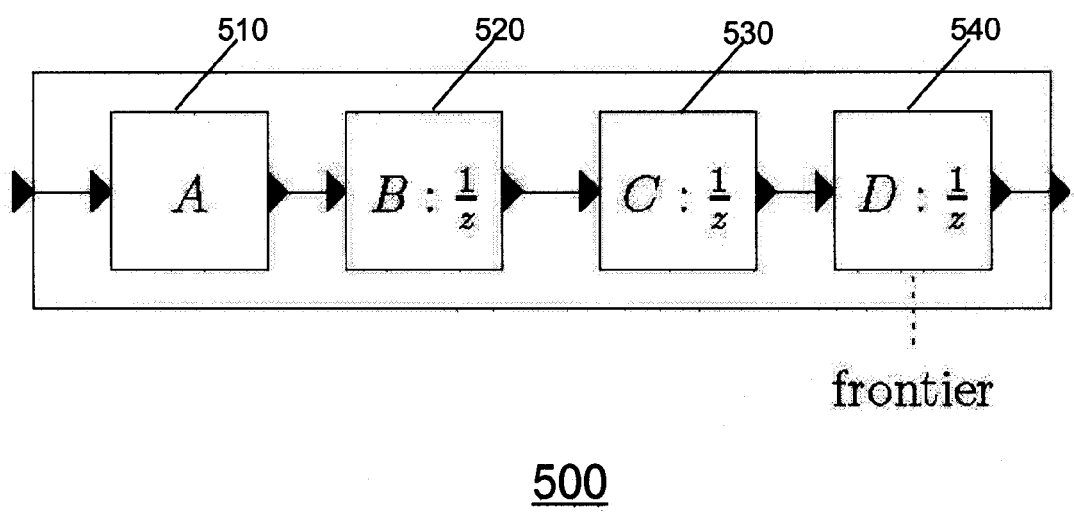
FIG. 5 illustrates an exemplary Moore-sequential block and its frontier according to an embodiment of the present invention.

FIG. 5 illustrates an exemplary frontier and left blocks in a case of a chain of Moore-sequential blocks 500. Block 540 is the frontier, blocks 530, 520, 510 are left blocks.

Figure 6:
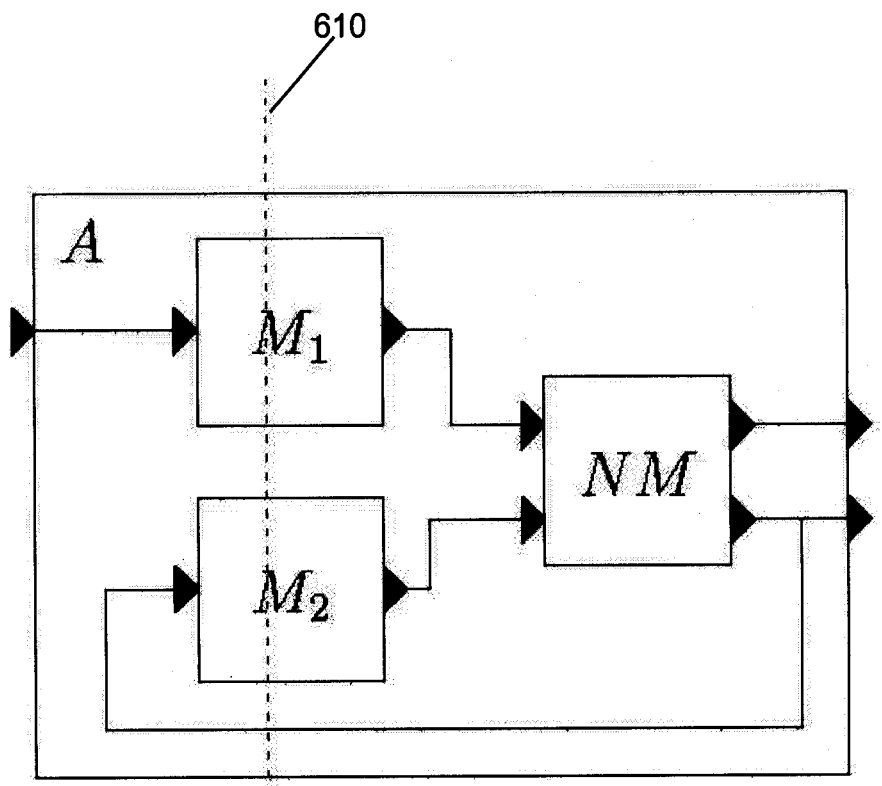
FIG. 6 illustrates an exemplary Moore-sequential block and its frontier according to an embodiment of the present invention.

FIG. 6 illustrates an exemplary frontier and right blocks in a case of feedback 600. The frontier 610 includes blocks $M_1$ and $M_2$. Block NM is a right block.

Trigger Elimination

In an embodiment, triggers can be eliminated by a "syntactic" transformation that preserves the semantics. In another embodiment, triggers are eliminated by treating them directly. As a result, more diagrams are accepted, which would otherwise be rejected.

Figure 7:
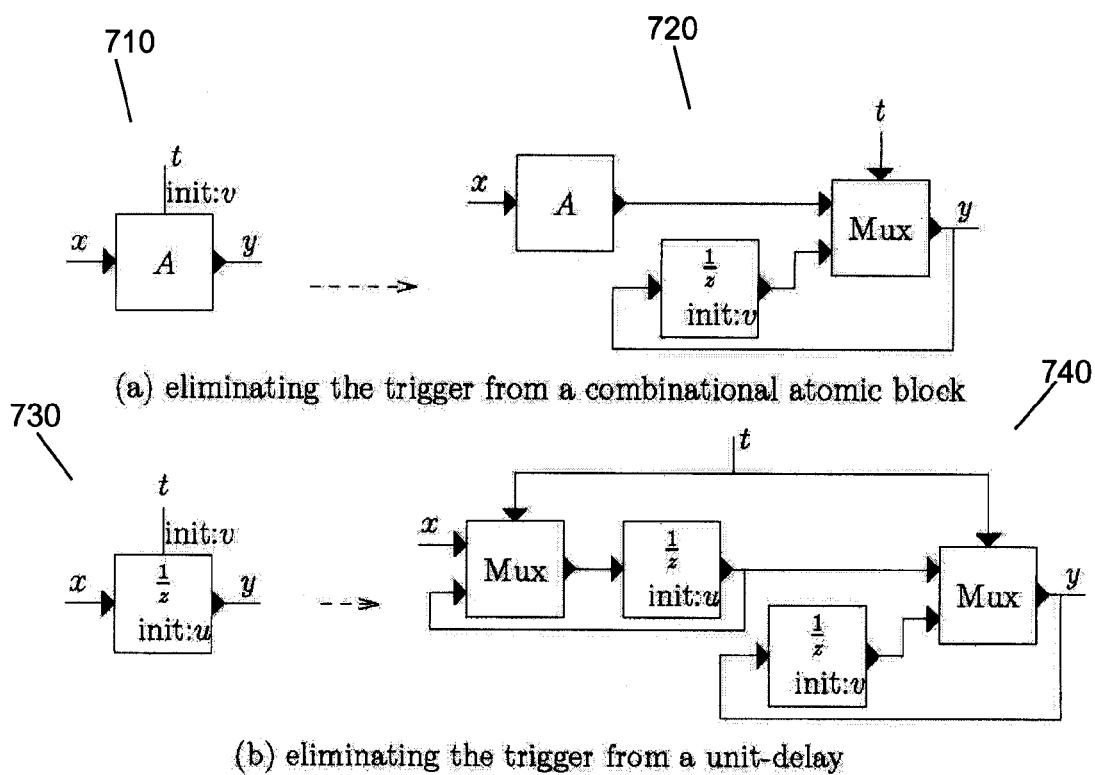
FIG. 7(a) illustrates an elimination of the trigger from a combinational atomic block according to an embodiment of the present invention.
FIG. 7(b) illustrates an elimination of the trigger from a unit-delay block according to an embodiment of the present invention.

In another embodiment, when the block includes only two types of atomic blocks: combinational blocks or the unit-delay block 1/z, the trigger elimination procedure is top-down. The elimination procedure starts with the top-level macro block, which is not triggered but may contain triggered sub-blocks in its internal diagram. Then, if A 710 is a combinational atomic block, then its trigger with blocks 720 is eliminated as shown in FIG. 7(a). If A is the unit-delay atomic block denoted 1/z 730, then its trigger with blocks 740 is eliminated as shown in FIG. 7(b).

Figure 8:
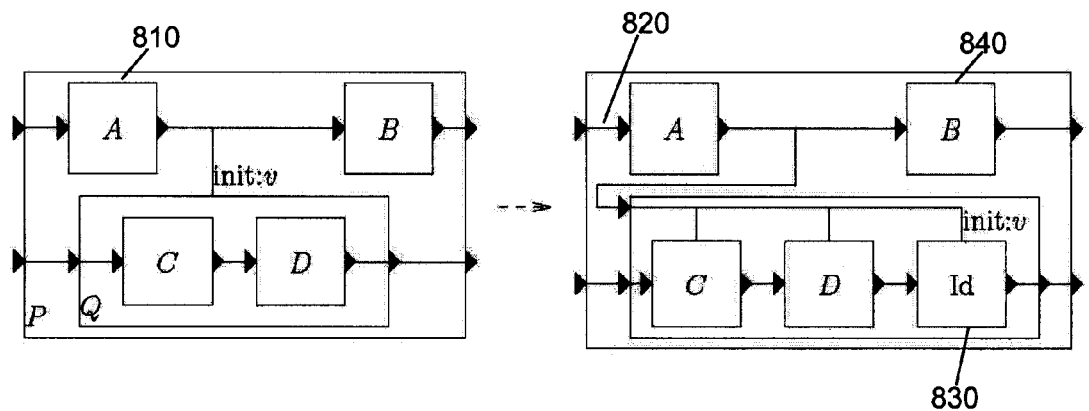
FIG. 8 illustrates eliminating the trigger from a macro block according to an embodiment of the present invention.

FIG. 8 illustrates eliminating the trigger from a macro block 800 according to an embodiment of the present invention. In one embodiment, A 810 is a macro block. The trigger is eliminated by adding this trigger to the inputs of A, and propagating it in the internal diagram of A, triggering all its sub-blocks. In particular, let t be the trigger input of A. The new input port 820 for A and connect t to this input port, removing at the same time the trigger. Then all internal blocks of A are triggered by this new input. Also, for each output y of A, an "Id block" ("identity-function block") 830 is inserted right after the block producing y and set the initial value of this triggered Id block to the initial value of y (note that the "Id block" is also triggered by t). For instance, in the example shown in FIG. 8, an Id block is inserted right after the output of block D and set its initial value to v, which is the initial value specified for the output of block Q.

In another embodiment, if some sub-block B 840 of A 810 is already triggered by some other trigger t', then an atomic block may be added to compute the logical "and" oft and t', such as t"=t∧t', and then use t" as the trigger for B 840.

Figure 9:
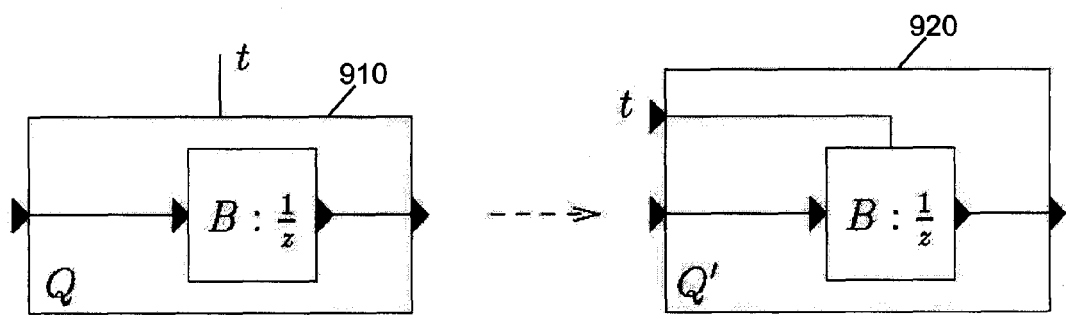
FIG. 9 illustrates how trigger elimination may turn a Moore-sequential block into a non-Moore sequential block according to an embodiment of the present invention.

FIG. 9 illustrates a trigger elimination that turns a Moore block into a non-Moore block according to an embodiment of the present invention. Trigger elimination 900 may turn a Moore-sequential macro block into a non-Moore-sequential block. This is illustrated in FIG. 9. Q 910 is Moore whereas Q' 920 is not. As a result, trigger elimination may result in some diagrams being rejected by some of the code generation methods described later, although they would be accepted before the elimination procedure. However, trigger elimination cannot change a diagram that is acyclic to cyclic.

In another embodiment, flattening may be necessary. In some embodiments, semantics are only assigned to flat block diagrams, that is, block diagrams that only contain atomic blocks. Before flattening, the trigger elimination procedure is applied to all macro blocks. Then starting with the top-level diagram (which may consist of a single macro block a macro block A is replaced by its internal diagram. While doing so, any connections that would be lost are re-instituted: If an input port p of A is connected externally to an output port q and internally to an input port r, then q to r are connected directly. Similarly for output ports of A. Finally, the process is finished when there are no more macro blocks left.

Figure 10:
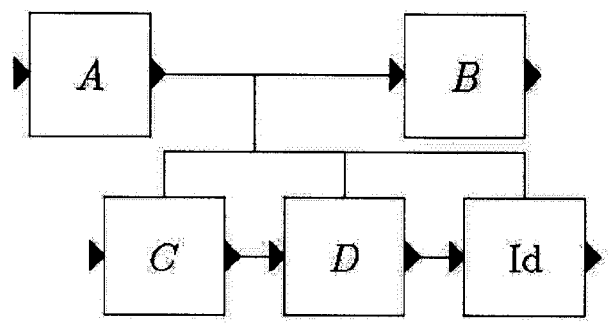
FIG. 10 illustrates a block diagram and possible dependency graphs for it according to an embodiment of the present invention.
Figure 10:
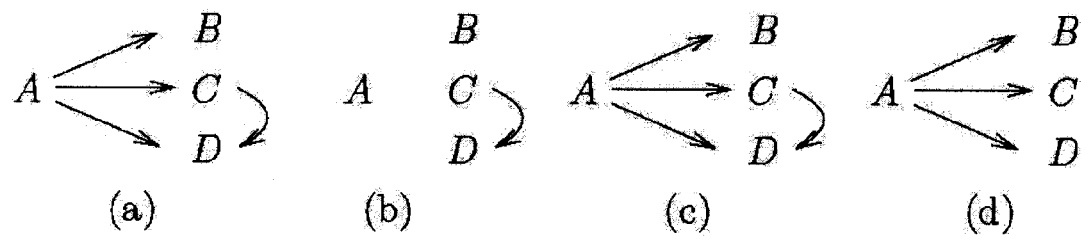

FIG. 10 illustrates a block diagram and possible dependency graphs for it according to an embodiment of the present invention. A graph shown in FIG. 10(a) results if no blocks are Moore-sequential. A graph as shown in FIG. 10(b) results if only A is Moore-sequential. A graph as shown in FIG. 10(c) results if only B is Moore-sequential. A graph as shown in FIG. 10(d) results if only C is Moore-sequential. Depending on the classification of the blocks, different graphs may result.

In one embodiment, semantics are assigned to closed, flat, acyclic block diagrams. In another embodiment, the "closed" requirement may be lifted by assigning semantics to the entire diagram as a function (e.g., functions for atomic blocks). In this embodiment, semantics may be assigned directly to hierarchical diagrams by assigning function semantics to every block in the hierarchy. In a further embodiment, each signal x of the diagram is interpreted as a total function x: N→V, where N={1,2,3, . . . } and V is a set of values. The set N models discrete time, so that x(k) can be seen as the value of signal x at time instant k. In another embodiment, time instants k, k+1, . . . , do not have a physical meaning. For instance, the difference k+1−k=1 does not necessarily imply that there is a duration of one time unit between successive time instants, nor that this duration is the same for all instants. Thus, the term logical time may also be appropriate. In another embodiment, all signals, including outputs of triggered blocks, have values at all times. Note: x(k) may be written as $x_k$, for convenience.

The values of signals are defined based on the blocks that produce these signals as outputs, as well as the input signals to these blocks. Consider first non-triggered blocks. Let A be a combinational block with some output z and inputs x and y. A implements some memoryless function $F_A$: V×V→V. Assuming that $x_k$ and $y_k$ are already defined, then $z_k$ as: $z_k = F_A(x_k, y_k)$. Now consider a unit-delay block B with output y and input x. B defines $y_k = x_k - 1$, for k>1, and $y_1 = s_0$, where $s_0$ is the initial state of B. More generally, any sequential block B with input x and output y can be represented as a function $F_B$: V×V→V×V. This function defines two signals: the output signal y plus the internal state signal s. The latter is also defined at time 0 (initial state). Then, $(s_k, y_k) = F_A(x_k, s_{k-1})$, for k=1, 2, . . . . If B is Moore-sequential, then $F_B$ can be "composed" from two separate functions: $F_B^s$: V×V→V and $F_B^s$: V→V, such that $s_k = F_B^s(X_k, s_{k-1})$ and $y_k = F_B^o(s_{k-1})$.

The Profile Dependency Graphs and Scheduling Dependency Graphs

In one embodiment, the profile of a block A contains a dependency graph. The nodes of these graph are the interface functions, also listed in A's profile. Given two such functions A. f( ) and A. g ( ), an edge f→g in the graph denotes a dependency. In other words, A. f( ) must be called before A. g( ) at every execution cycle. Every interface function has a signature that includes the inputs and outputs of this function. The inputs correspond to input ports of A and the outputs to output ports of A. In some embodiments, the function may have zero or more inputs, and zero or more outputs.

In one embodiment, the macro block P for which dependency analysis is to be performed is provided as input. During the dependency analysis, a scheduling dependency graph (SDG) for the macro block is built. The SDG may be passed on to the code generation step. The SDG for the block may be built essentially by connecting the profile dependency graphs of all sub-blocks of the macro block. For example, for each sub-block A of the macro block, the SDG of macro block contains all nodes and edges of the profile dependency graph of A. If A is a triggered block in the macro block then the SDG of the macro block contains an additional node called A.t. A.t is a new node, distinct from all nodes of the dependency graph of the sub-block. In addition, the SDG of the macro block contains an edge from A.t to each node from the dependency graph of the sub-block.

In some embodiments, the SDG of P has the following additional edges: If A and B are sub-blocks of P, such that an output port y of A is connected to an input port x of B, then: Let A.f( ) be the interface function of A producing output y: this function is guaranteed to be unique. Let B.g( ) be an interface function of B having as input x: in general there can be more than one such functions of B. For each such function B.g( ), an edge A.f( )→B.g( ) is added to the SDG of P. If A and B are sub-blocks of P, such that an output port y of A triggers B, then the edge A.f( )→B.t is added to the SDG of P, where B.t is the trigger node for B and A.f( ) is the unique function of A producing y.

Figure 11:
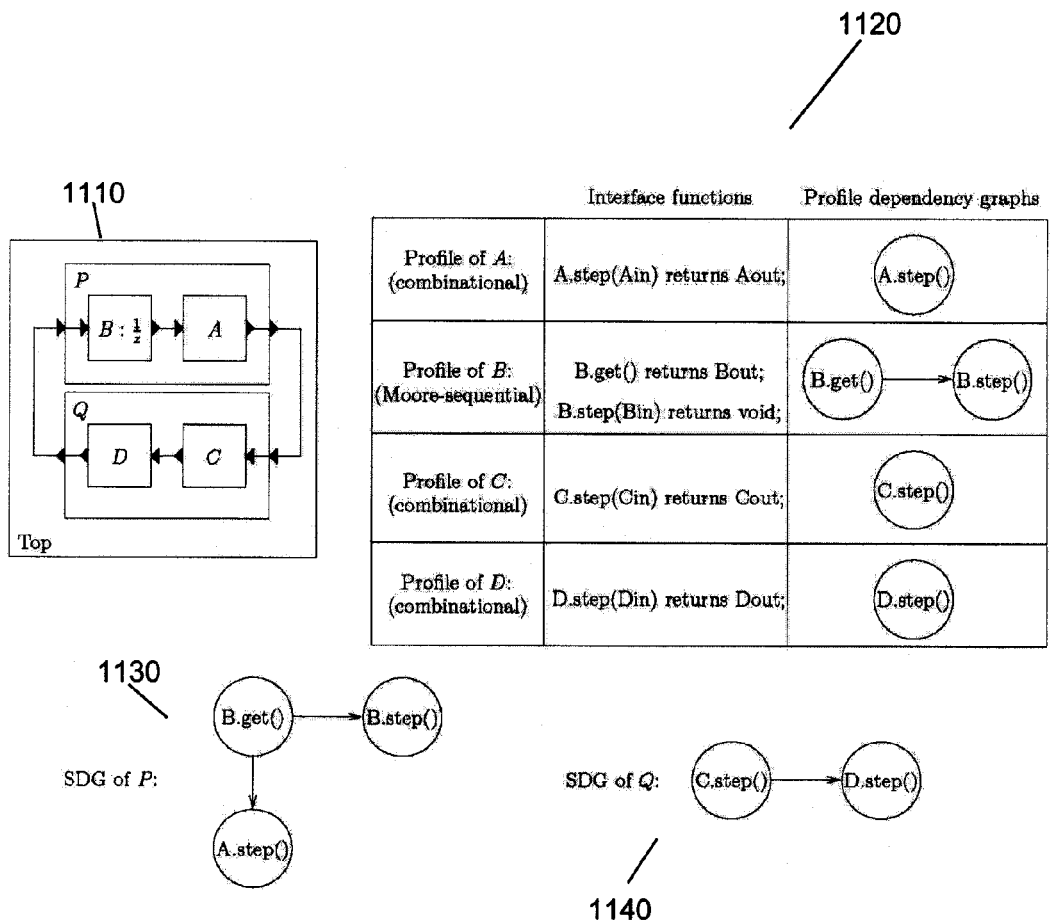
FIG. 11 illustrates a hierarchical block diagram, profiles of its atomic blocks and scheduling dependency graphs (SDG's) for macro blocks P and Q according to an embodiment of the present invention.

For example, FIG. 11 illustrates a hierarchical diagram 1110, profiles of its atomic blocks 1120, and SDGs for macro blocks P 1130 and Q 1140 according to an embodiment of the invention. In one embodiment, profiles 1120 include individual profiles for the internal blocks A and B of P and C and D of Q, respectively. A, C and D have only one function each, while B has two functions, step( ) and get( ). B.step( ) returns no output, while B.get( ) receives no input. The SDG's for macro blocks P and Q are shown 1130, 1140 respectively.

Figure 12:
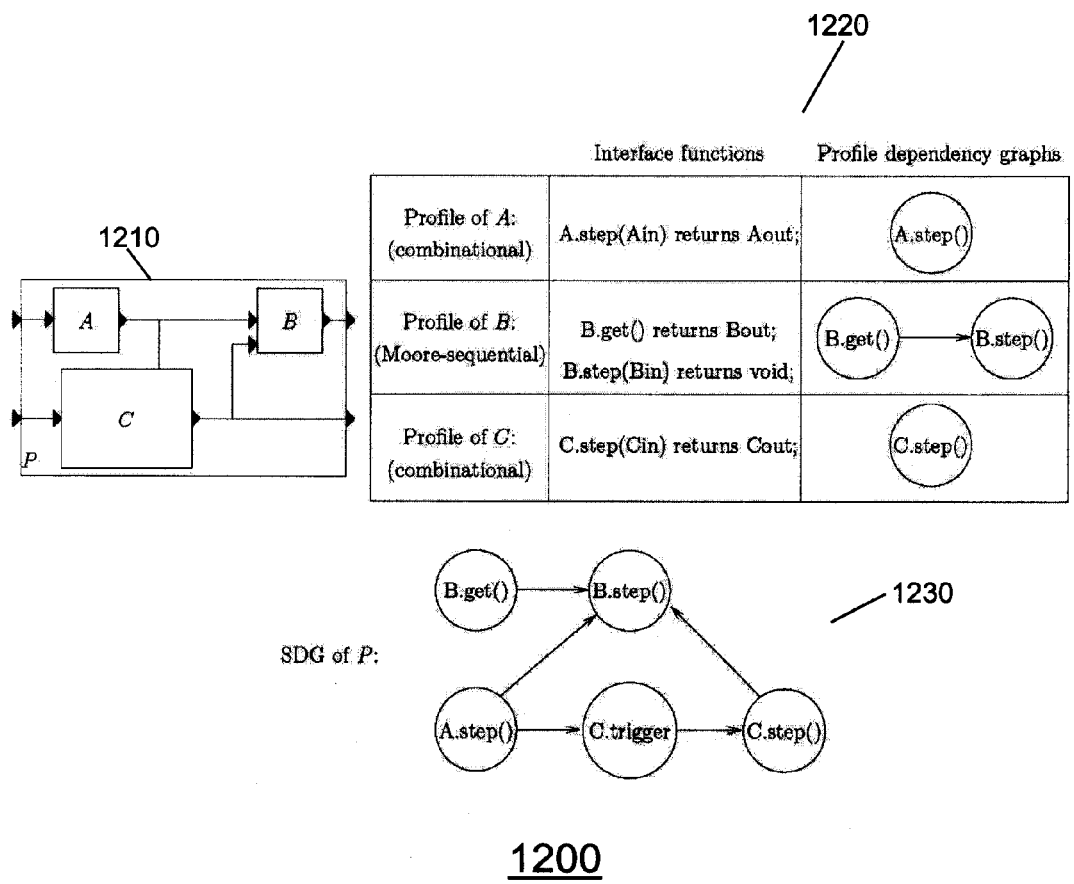
FIG. 12 illustrates a hierarchical block diagram with a trigger, profiles of its atomic blocks and scheduling dependency graph (SDG) for macro block P according to an embodiment of the present invention.

Another example, with a trigger 1200, is shown in FIG. 12, which illustrates a scheduling dependency graph with a trigger. This graph is built from a block diagram 1210 having blocks A, B and C and one trigger to block C. A profile table 1220 is shown having profiles of each individual block profiles. The SDG 1240 is built including the triggered block C.

The "Step-Get" Code Generation Method

The "step-get" code generation method takes as input a macro block P with its internal diagram, the class of P (combinational, Moore-sequential or non-Moore sequential) produced by the Classification step and the SDG of P produced by the Dependency Analysis step. This SDG must be acyclic (contain no cycles). The "step-get" code generation method produces a profile for P. This profile includes a set of interface functions, dependency graph and implementations of all interface functions.

The Interface Functions for P According to the Step-Get Method

If P is a combinational block, it has a single interface function called step( ) that accepts all inputs and returns all outputs:

P.step(inputs) returns (outputs);

If P is a sequential block but not a Moore-sequential block, then it has two interface functions:

P.init( ) returns void;
P.step(inputs) returns (outputs);

The function init( ) takes no inputs and returns no outputs: it is only called upon initialization to initialize the state of P.

If P is a Moore-sequential block, then it has three interface functions:

P.init( ) returns void;
P.step(inputs) returns void;
P.get( ) returns (outputs);

The function init( ) is as before. The function step( ) updates the state at every cycle and returns no outputs. The function get( ) takes no inputs, and returns all outputs for the current cycle.

The Dependency Graph for the Profile of P According to the Step-Get Method

If P is a combinational or non-Moore sequential block, then its dependency graph has a single node called P.step( ) and no edges. If P is a Moore-sequential block, then its dependency graph has two nodes P.step( ) and P.get( ) and an edge P.get( )→P.step( ). This denotes that P.get( ) must be called before P.step( ), at every cycle.

The Implementation of the Interface Functions According to the Step-Get Method

The implementation of the interface functions is done in an object-oriented manner: a class for P in a certain object-oriented language (C++, Java, etc.) may be generated. Languages such as C may also be used, by implementing appropriate structures like records to hold the persistent variables of an object (instance of the class). The class for P in pseudo-code has the following structure:

```
class P_code {
    // declaration of internal persistent variables
    P_out1: integer;
    P_out2: boolean;
```

```
P_internal_signal_1: integer;
P_internal_signal_2: real;
...
// implementation of interface functions
P.init( ) {
  ...
}
P.step(integer P_in1, real P_in2, ... ) returns (integer,
    boolean, ... ) { ...
}
...
}
```

There is an internal variable for each output port of P: P_out1, P_out2, etc. There is also an internal variable for each internal signal of P: P_internal_signal1, etc. All these variables are persistent. They maintain their values across execution of the different interface functions. In one embodiment, in an object-oriented language, this is achieved by maintaining across the lifetime of an object (instance of the class).

Implementing init( ): P.init( ) needs to be implemented only for a sequential block P. In one embodiment, the init( ) functions of sub-blocks of P are called in an arbitrary order. P.init( ) calls A.init( ) for every sub-block A of P that is sequential (therefore must also have A.init( ) in its interface). P.int( ) initializes the outputs of any triggered sub-blocks of P to their initial value (specified by the user in the diagram).

For example, for the macro block P shown in FIG. 8, and assuming A is combinational, while B and Q are sequential, an implementation of P.init( ) is:

```
P.init( ) {
  B.init( );
  Q.init( );
  P_out2:=initial_value_v;
}
```

The implementation of step( ) for a macro block P is different depending on whether P is a Moore-sequential block or a non-Moore-sequential (i.e., combinational or sequential but non-Moore). In some embodiments, A is non-Moore-sequential. P.step( ) in those embodiments are implemented by performing a topological sort algorithm on the SDG of P; calling all the interface functions of sub-blocks of P in the order determined by the topological sort; and if A is a sub-block of P triggered by some signal x then placing the calls to all interface functions of A within a conditional if-statement guarded by x. In some embodiments, topological sort algorithm is performed on the SDG of P, in order to find a total order of the nodes of the graph that is compatible with the dependencies expressed in the graph. Such an order always exists because the graph is assumed to be acyclic. In some embodiments, all the interface functions of sub-blocks of P are called in the order determined by the sort algorithm. The results returned by these interface functions are stored in the internal signal variables of the class of P.

In other embodiments, P is a Moore-sequential macro block. P.step( ) and P.get( ) are implemented by splitting the SDG of P and performing a topological sort on each side and if A is a sub-block of P triggered by some signal x then placing the calls to all interface functions of A within a conditional if-statement guarded by x.

In some embodiments, the SDG of P is split in two subgraphs: the left SDG of P and the right SDG of P. Such a split is always possible for a Moore-sequential block P, because of the existence of left, right and frontier sub-blocks $M_1$, $M_2$, ..., $M_k$ of P. Because each frontier block Mi is Moore-sequential, it each has exactly two nodes in its profile dependency graphs, $M_i$.get( ) and $M_i$.step( ) with the dependency $M_i$.get( )→$M_i$.step( ). The left SDG of P consists of all $M_i$.step( ) nodes, as well as all the nodes of the left sub-blocks of P, and corresponding edges. The right SDG of P consists of all $M_i$.get( ) nodes, as well as all the nodes of the right sub-block of Ps, and corresponding edges.

In some embodiments, a topological sort algorithm is performed on the left SDG of P, and P.step( ) is implemented by calling all the interface functions in the left SDG in the order determined by the topological sort. The results returned by these interface functions are stored into the internal signal variables of the class of P.

In some embodiment, a topological sort algorithm is performed on the right SDG of P, and P.get( ) is implemented by calling all the interface functions in the right SDG in the order determined by the topological sort. The results returned by these interface functions are stored into the internal signal variables of the class of P.

For example, the implementation of interface functions for blocks P, Q and Top of FIG. 11 could be as follows. Assume in this example that B is a Moore-sequential block, while A, C, and D are not. Then, P is also a Moore-sequential block while Q is not. The implementation of Q.step( ) is:

```
Q.step(Q_in) returns Q_out {
  C_out:=C.step(Q_in);
  Q_out:=D.step(C_out);
  return Q_out;
}
```

Again referring to FIG. 11 and continuing the above example, the implementation of P.step( ) and P.get( ) is:

```
P.step(P_in) {
  B.step(P_in);
}
P.get( ) {
  B_out:=B.get( );
  P_out:=A.step(B_out);
  return P_out;
}
```

Again referring to FIG. 11 and continuing the above example, the block Top has no outputs, thus by definition it is Moore-sequential. However, since it has no outputs, its right SDG is empty, thus Top.get( ) is empty. As a result, the implementation of Top.step( ) is obtained by serializing the left SDG of Top, which is the same as its entire SDG:

```
Top.step( ) {
  P_out:=P.get( );
  Q_out:=Q.step(P_out);
  P.step(Q_out);
}
```

In this embodiment, there is only one possible execution order for the top-level diagram.

As another example of interface function implementation, in a case with triggers, assume a macro block P as shown in FIG. 12. P also has sub-blocks A, B and C. Given the profiles of sub-blocks shown in FIG. 12, the Classification method determines that P is a non-Moore sequential block. The implementation of P.step( ) is obtained by serializing the SDG of P and guarding the execution of triggered block C by the condition that the trigger A_out be true:

```
P.step(P_in1, P_in2) returns (P_out1, P_out2) {
  A_out:=A.step(P_in1);
  P_out1:=B.get( );
  if (A_out) then
    P_out2:=C.step(P_in2,
  end if;
  B.step(A_out, P_out2);
  return(P_out1, P_out2);
}
```

The "Per-Port" Code Generation Method

The "per-port" code generation method takes as input a macro block P with its internal diagram, the class of P (combinational, Moore-sequential or non-Moore sequential) produced by the Classification step and the SDG of P produced by the Dependency Analysis step. This SDG must be acyclic (contain no cycles). The "per-port" code generation method produces a profile for P. This profile includes an interface function, a bipartite input-output dependency graph, and SDG clustering.

The Interface Functions for P According to the Per-Port Method

This code generation method generates a variable number of interface functions for different blocks. If P is a sequential block, a P.init( ) function is also generate: the signature and implementation for this function is exactly as described in the "step-get" method.

The Bipartite Input-Output Dependency Graph

Let P be the macro block for which code is generate. First, the bipartite input-output dependency graph (BIODG) is built for P. Let the set of outputs of P be $Y=\{y_1, \ldots, y_n\}$. For each $y_i$ the BIODG of P shows the set of inputs of P that $y_i$ depends upon: $y_i$ depends on a given input x if there is a path in the SDG of P starting at some node f that takes x as input and ending in the (unique) node that produces $y_i$ as output. In some embodiments, the outputs may not depend upon any input. For example, this is the case for Moore-sequential blocks.

SDG Clustering in the Per-Port Method

In order to determine the number and signatures of the interface functions of P, the SDG is clustered in a number of sub-graphs Gs. This is done accordingly by building the BIODG, partitioning the outputs, ordering the outputs and building the sub-graphs, and if, at the end of the above procedure, there are still nodes of sub-graph G not included in any of the k sub-graphs, an additional k+1th sub-graph $G_{k+1}$ are built and all remaining nodes are added to it.

In one embodiment, the set of outputs Y is partitioned into the minimal number of k disjoint subsets Y1, . . . , Yk, such that for each i=1, . . . , k, all outputs in $Y_j$ depend on the same set of inputs.

In another embodiment, the subsets $Y_1, \ldots, Y_k$ are ordered using the following partial order: For i≠j, $Y_i < Y_j$ iff the set of inputs that $Y_i$ depends upon is a subset of the set of inputs that $Y_j$ depends upon.

In another embodiment, k sub-graphs $G_i$ of G, are built for each i∈{1, . . . , k}. The graphs are built according to the partial order<established on $Y_i$ as described above: first the graphs corresponding to the minimal elements in this partial order is built (e.g., the ones that depend on the least number of inputs); then the next elements in the partial order, etc. All nodes needed to produce an output in $Y_i$ are added to $G_i$, except if such a node has already been included in a previously built sub-graph $G_j$.

Interface Function Implementation in the Per-Port Method

At the end of the above clustering method between k and k+1 sub-graphs are left. These sub-graphs are disjoint: no node belongs in two sub-graphs. Then, for each sub-graph Gi, for i=1, . . . , k, an interface function is generated by:

P.get_i(inputs that Y_i depend upon) returns (outputs Y_i);

If sub-graph $G_{k+1}$ exists, the interface function maybe be generated by:

P.step(inputs that nodes in G_k+1 depend upon) returns void;

The implementation of interface function P.get_i or P.step( ) is obtained by serializing the corresponding sub-graph $G_i$ using a topological sort algorithm, as in the "step-get" method. All functions in $G_i$ are called in the order determined by this serialization and the results are stored in internal signal variables. In some embodiments, the calls of triggered blocks are embedded within conditional if-statements.

Figure 13:
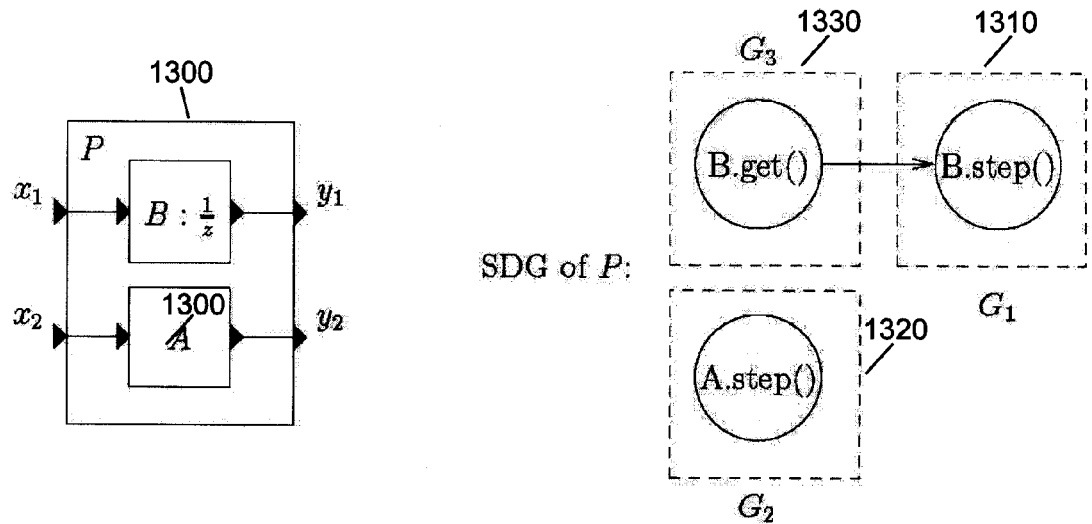
FIG. 13 illustrates a macro block P and its scheduling dependency graph (SDG) clustered into three sub-graphs using the per-port clustering method according to an embodiment of the present invention.

FIG. 13 illustrates a macro block P and its SDG clustered into three sub-graphs using the per-port clustering method according to an embodiment of the present invention. In some embodiments, A is a combinational block and B is Moore-sequential 1300. The profiles for A and B are as shown in FIG. 11.

This SDG is clustered in 3 sub-graphs G1 1310, G2 1320, G3 1330. In some embodiments, the clustering procedure may be as described. Other clustering procedures may also be used. Block P has two outputs $y_1$, $y_2$. y1 depends on no inputs because B is Moore-sequential. $y_2$ depends on $x_2$. Thus, $Y_1=\{y_1\}$ and $Y_2=\{y_2\}$ and k=2. $G_1$ is built first and then $G_2$. Create $G_3$ if node B.step( ) belongs to neither sub-graphs.

Finally, the following interface functions for P is generated:

```
P.get_1( ) returns y_1 {
    y_1:=B.get( );
    return y_1;
}
P.get_2(x_2) returns y_2 {
    y_2:=A.step(x_2);
    return y_2;
}
P.step(x_1) {
    B.step(x_1);
}
```

The "Dynamic" Code Generation Method

The dynamic code generation method is able to generate code for all acyclic diagrams.

The "dynamic" code generation method takes as input a macro block P with its internal diagram, the class of P (combinational, Moore-sequential or non-Moore sequential) produced by the Classification step and the SDG of P produced by the Dependency Analysis step. This SDG must be acyclic (contain no cycles). The "dynamic" code generation method produces a profile for P.

SDG Clustering in the Dynamic Method

Similar to the per-port method, in order to determine the number and signatures of the interface functions of P, the SDG is clustered in a number of sub-graphs. The difference in this case is that the SDG clustering does not result in disjoint sub-graphs, as in the per-port method, but in sub-graphs that may share some nodes. This is done by building the BIODG of P, partitioning the outputs and iteratively builds the sub-graph.

In some embodiments, the set of outputs Y is partitioned into the minimal number of k disjoint subsets $Y_1, \ldots, Y_k$, such that for each i=1, . . . , k, all outputs in $Y_i$ depend on the same set of inputs.

In some embodiments, iteratively, for i=1, . . . , k, k sub-graphs of G, $G_i$ are built. Unlike the per-port method, $G_i$'s are not disjoint in the dynamic method. All nodes needed to produce an output in $Y_i$ are added to $G_i$, even if these nodes have also been included in another sub-graph. If, at the end of the above procedure, there are still nodes of G not included in any of the k sub-graphs, an additional k+1-th sub-graph $G_{k+1}$ is built and all remaining nodes are added to it. For every node f an integer number $N_f$ that is equal to the number of sub-graphs that the node belongs to is computed.

Assigning Modulo Counters to Internal Interface Functions

For each interface function f of a sub-block of P, if $N_f > 1$ then a modulo-$N_f$ counter is created for f this is a counter that "wraps" to zero when its value reaches $N_f$. For instance, a modulo-2 counter counts 0, 1, 0, 1 . . . A modulo-3 counter counts 0, 1, 2, 0, 1, 2 . . . And so on. Each modulo counter is part of the persistent internal variables of the class of P. The counter for f serves to indicate whether f has already been called in the current execution cycle or not: f has been called iff it's modulo counter is greater than zero.

Interface Function Implementation in the Dynamic Method

At the end of the above clustering method, between k and k+1 sub-graphs of G are left. These sub-graphs cover G: every node of G belongs in some sub-graph. However, they are not necessarily disjoint. Then, an interface function is generated for each sub-graph $G_i$, for i=1, . . . , k P.get_i(inputs that Y_i depend upon) returns (outputs Y_i);
If sub-graph $G_{k+1}$ exists, an interface function is generated P.step(inputs that nodes in G_k+1 depend upon) returns void;

The implementation of interface function P.get_i or P.step( ) is obtained by serializing the corresponding sub-graph $G_i$ using a topological sort algorithm. All functions in $G_i$ are called in the order determined by this serialization and results are stored in internal signal variables. Contrary to the per-port method, however, the call to every method f that has $N_f>1$ is guarded by the condition $c_f=0$, where $c_f$ is the modulo counter associated to f. The calls of triggered blocks are embedded within conditional if-statements as before.

The Dependency Graph for the Profile of P According to the Dynamic Method

The nodes of the dependency graph for the profile of P are all interface functions for P generated above, except P.init( ). If there is no function P.step( ) then the dependency graph contains no edges. If there is such a function, then the dependency graph contains an edge P.get_i( )→P.step( ) for each interface function P.get_i( ) of P.

Figure 19:
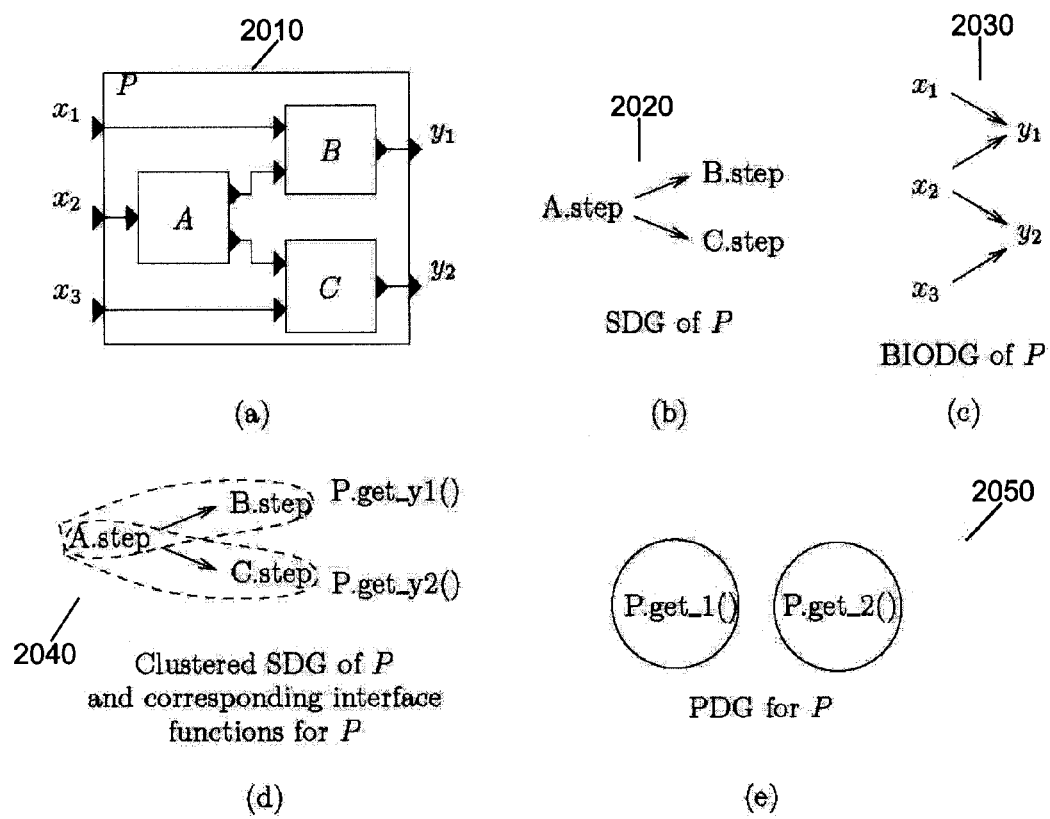
FIGS. 19 (a)-(e) illustrates a block diagram and the SDG, BIODG, clustering SDG and profile dependency graph (PDG) of the block according to an embodiment of the invention.

For example, for the diagram P 210 shown in FIG. 19(*a*), P includes three input ports and two output ports. In the interior of P 2010, there are three sub-blocks A, B and C. A has an input port that is connected to one of the input port of P $x_2$ and two output ports where one is connected to B and the other is connected to C. B has two input ports: one is connected to the second input port of P $x_1$ and the other is connected to the output port of A. B has one output port connected to the output port of P $y_1$. C has two input ports: one is connected to the third input port of P $x_3$ and the other is connected to the other output port of A. C also has an output port connected to the other output port of P $y_2$.

The SDG 2020 of P is shown in FIG. 19*b*) and the BIODG 2030 of P is shown in FIG. 19(*c*). According to the dynamic method of this invention, the SDG is clustered 2040 in two sub-graphs as shown in FIG. 19(*d*), where function A.step( ) belongs in both sub-graphs, thus has an associated modulo-2 counter c_A_step. In one embodiment, two interface functions for P are generated as shown below:

```
P.get__1(x1, x2) returns y__1 {
    if (c_A_step=0) {
        (z1, z2):=A.step(x2);
    }
    c_A_step:=(c_Astep+1) modulo 2;
    y1:=B.step(x1, z1);
    return y1;
}
P.get__2(x2, x3) returns y__2 {
    if (c_A_step=0) {
        (z1, z2):=A.step(x2);
    }
    c_A_step:=(c_A_step+1) modulo 2;
    y2:=C.step(z2, x3);
    return y2;
}
```

In one embodiment, P.get_1( ) and P.get_2( ) are called exactly once in each cycle. Therefore, the counter c_A_step is incremented exactly twice at each cycle. This implies that if the value of the counter is zero in the beginning of the cycle, it will be zero also at the end of the cycle (recall this is a modulo-2 counter). Thus, the counter is correctly wrapped to zero at the end of the cycle, so that at the beginning of the next cycle the method is ready to be called again.

In one embodiment, the PDG 2050 for P is generated as shown in FIG. 19(*e*). It contains two nodes corresponding to the two interface functions P.get_1( ) and P.get_2( ) and no dependencies between them.

Figure 14:
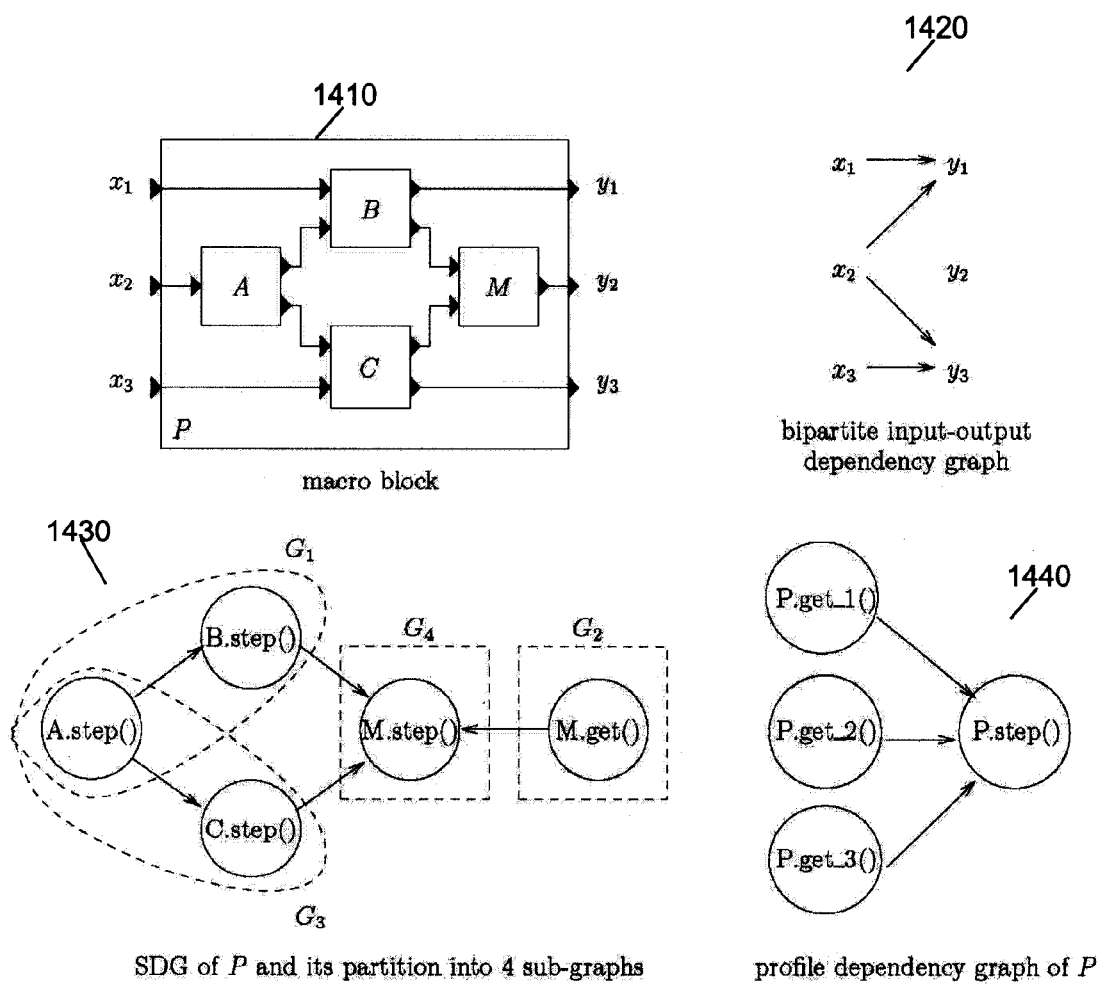
FIG. 14 illustrates a hierarchical block diagram, the bipartite input-output dependency graph (BIODG) and the scheduling dependency graph (SDG) for macro block P, the clustering of the SDG into four sub-graphs according to the dynamic code generation method, and the profile dependency graph for P, according to an embodiment of the present invention.

Another example is provided in FIG. 14. FIG. 14 illustrates a dynamic code generation method according to an embodiment of the present invention. FIG. 14 includes an exemplary macro block P 1410, a bipartite input-output dependency graph 1420, SDG of P and clustered into 4 sub-graphs $G_{1-4}$, and profile dependency graph of P. It is assumed that M is a Moore-sequential block and the others are combinational.

There are three classes of outputs: $\{y_1\}$ (depending on $\{x_1, x_2\}$), $\{y_2\}$ (depending on no inputs, or $\phi$), and $\{y_3\}$ (depending on $\{x_2, x_3\}$). Consequently there are three methods, one for each output. There is also a step( ) method in this case. The complete implementation for P is shown below:

```
P.get1(x1, x2) returns y1{
    if (c_A_step=0) {
        (a1, a2):=A.step(x2);
    }
    c_A_step:=(c_A_step+1) mod 2;
    (y1, b):=B.step(x1, z1);
    return y1;
}
P.get2( ) returns y2 {
    return M.get( );
}
P.get3(x2, x3) returns y3 {
    if (c_A_step=0) {
        (a1, a2):=A.step(x2);
    }
    c_A_step:=(c_A_step+1) mod 2;
    (c, y3):=C.step(z2, x3);
    return y3;
}
void P.step( ) {
    M.step(b, c);
}
```

Figure 15:
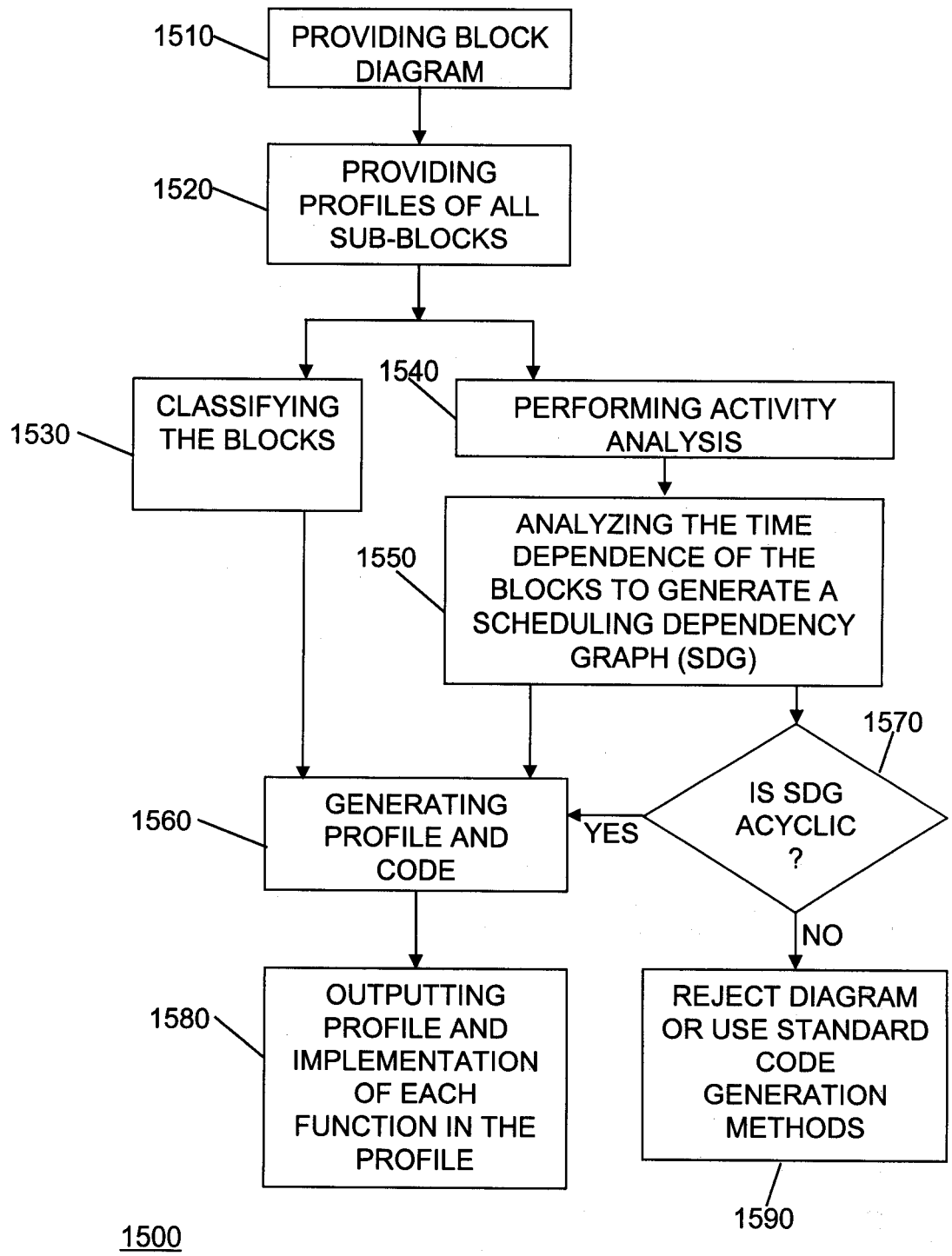
FIG. 15 depicts another flow diagram for generating code for timed block diagrams according to an embodiment of the invention.

FIG. 15 depicts a flow diagram for generating code for timed block diagrams. This flow diagram represents an embodiment of the present invention for generating code from a timed block diagram having sub-blocks.

At 1510, one or more block diagrams having macro blocks and sub-blocks are provided to the code generator. One or more of the block diagrams are timed block diagrams. The code generation scheme for timed block diagrams of FIG. 15 is similar to the one for untimed block diagrams of FIG. 2 but includes timing information. For example, the timed block diagrams may have timed profiles. These may be extensions of the untimed block profiles. Code generation for timed block diagrams may includes an additional step called Activity Analysis. This step computes for any two sub-blocks A and B of the macro block P for which code is to be generated, whether A and B can ever be fired at the same cycle.

A timed block diagram has specific firing time. A "timed" block diagrams has blocks that have specified "firing times". Usually these are periodic, possibly with an initial phase (or offset). In one embodiment, a pair ($\pi$, $\theta$) refers to where $\pi$ is the period and $\theta$ the initial phase the firing time of a block. In some embodiments, π>0 and θ≥0 are integers and that θ<π may be assumed. In some embodiments, firing times are only assigned to atomic blocks. In other embodiments, firing times are also assigned to macro blocks. The latter type can be translated into the former and vice-versa, so the two types are equally expressive.

The two timed notations are equally expressive, in the sense that a non-modular timed diagram can be translated into a modular timed diagram that has equivalent semantics and vice-versa.

At 1520, one or more profiles related to the sub-blocks are also provided to the code generator. The profile includes information regarding the firing time specification for each timed block. A timed profile includes the class, list of interface functions, a profile dependency graph and firing time specification. In some embodiments, the timed profile of a block A contains the class of A, as in the profile of an untimed block; the list of interface functions of A and their signature, as in the profile of an untimed block; the profile dependency graph of A, as in the profile of an untimed block; and A firing time specification for A.

At 1530, the blocks are classified. The definitions and procedures to classify blocks are the same as in untimed diagrams.

At 1540, activity analysis is performed. In this analysis, whether sub-blocks can ever be fired at the same time is determined. Activity analysis is one of the steps in code generation for timed diagrams. It computes, for any two sub-blocks A and B of the macro block P for which code is to be generated, whether A and B can ever be fired at the same cycle.

At 1550, an analysis of the time dependence of each block and sub-block is performed to generate a scheduling dependency graph (SDG) including the information from the activity analysis.

Dependency analysis for timed diagrams is essentially the same as for untimed diagrams. The only difference is that, when building the SDG for macro block P, the results of the Activity Analysis step are taken into account in order to eliminate some "false" dependencies, thus accepting more diagrams. In particular, when building the SDG of P: Before adding any edge A.f( )→B.g( ) whether A and B can be active at the same time is checked. If A and B can be active at the same time, then the edge is added, otherwise the edge is not added.

At 1560, code is generated using the classification information 1530 and the SDG from the analysis 1550. The code generation step for timed block diagrams involves in addition to the untimed code generation steps: computing the firing time specification of the macro block and associating modulo counters to factored firing time specifications.

At 1570, an analysis of the SDG is performed to determine whether the graph is acyclic. In another embodiment, a determination is performed whether the graph is cyclic. Any determination methods may be used.

At 1580, from the generated code, a profile and/or implementation of each function in the profile is provided. The outputs of the code generation scheme are the following: the profile for P and the implementation (in a certain programming language such as C++, Java, etc.) of each of the functions listed in the profile of P.

At 1590, if the SDG is cyclic, then the block diagram cannot be used for this flow process. In one embodiment, the diagram is rejected. In another embodiment, standard code generation methods are used to generate the code. In other embodiments, diagram may be recalculated. Any required step to modify the block diagram may be used in order to try to continue with code generation process.

Translation of Diagrams

The translation of a non-modular timed diagram into a modular timed diagram does not involve adding any new blocks or signals. It only involves assigning firing times to the macro blocks of the diagram. This produces a modular timed block diagram that is equivalent to the original non-modular diagram. Equivalent here means that for every signal x, the semantics of x in the original diagram is the same as the semantics of x in the new diagram. In same embodiments, x is a continuous-time signal updated at a given rate; therefore, "sampling" it at a faster rate than the update rate will not change its value.

Figure 16:
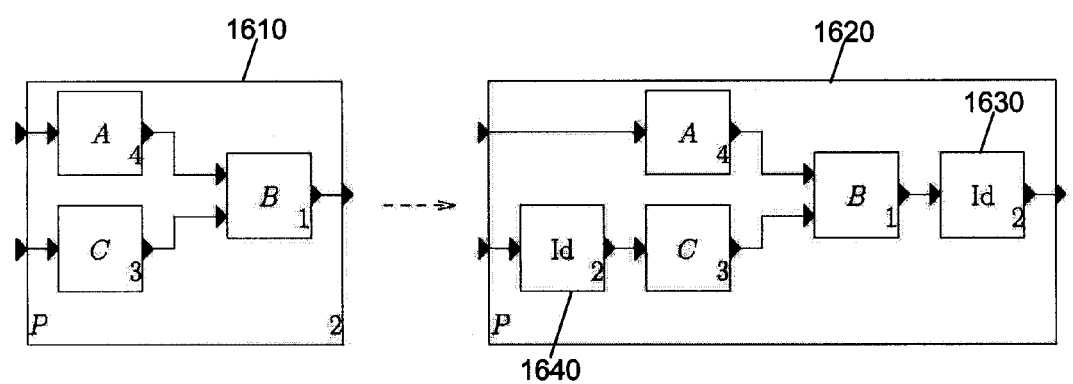
FIG. 16 illustrates translating a modular timed diagram into a non-modular timed diagram according to an embodiment of the invention.

An example of the translating of modular timed diagrams into non-modular timed diagrams is shown in FIG. 16. Block P 1610 is translated into block P 1620. Translating modular timed diagrams into non-modular timed diagrams involves adding atomic blocks that sample some signals. These are "Id blocks" (i.e., identity function blocks) with specific firing times, thus functioning as samplers. FIG. 16 includes blocks 1630 and 1640. In some embodiments, if P is a macro block of a modular timed diagrams with firing time (π, θ). an Id block may be inserted with firing time (π, θ) after every input port and before every output port of P and connect the signals accordingly. If an input signal is fed into a sub-block A of P such that A has a firing time that is a multiple of (π, θ) then the Id block is not needed for this input signal. Similarly, this is true for output signals.

Representing Firing Time Specifications with Pair

In one embodiment, a firing time specification can be represented by a (period, phase) pair. In some embodiments, some arithmetic operations on these pairs are defined that will be used by some types of code generation.

In some embodiments, a generalized GCD (greatest common divisor) operator may be used between firing time specifications represented as (period, phase) pairs. The generalized GCD operator GGCD is defined as follows:

$$GGCD\{(\pi_1, \theta_1), (\pi_2, \theta_2)\} = \begin{cases} (GCD(\pi_1, \pi_2), \theta_1), & \text{if } \theta_1 = \theta_2, \\ (GCD(\pi_1, \pi_2, \theta_1, \theta_2), 0), & \text{otherwise} \end{cases}$$

where GCD denotes the usual GCD operator. In one embodiment, when all phases are 0, GGCD is the same as GCD. Otherwise, for instance: GGCD {(2, 0), (2, 1)}=(1, 0); and GGCD {(6, 2), (12, 4))=(2, 0).

Assume (π, θ)=GGCD {(π_i, θ_i)}_i, for i=1, n. The division of pairs (π_i, θ_i) by their generalized GCD (π, θ) as follows:

$$\frac{(\pi_i, \theta_i)}{(\pi, \theta)} = \begin{cases} (\frac{\pi_i}{\pi}, \theta), & \text{if } \theta_i = \theta, \\ (\frac{\pi_i}{\pi}, \frac{\theta_i}{\pi}), & \text{otherwise} \end{cases}$$

For example, $$\frac{(6, 2)}{(2, 0)} = (3, 1)$$

and $$\frac{(12, 4)}{(2, 0)} = (6, 2)$$

In general, if $$\frac{(\pi', \theta')}{(\pi, \theta)}$$

is defined, then ($\pi'$, $\theta'$) is a multiple of ($\pi$, $\theta$).

Representing Firing Time Specifications with Finite Automata

By representing firing times as pairs (period, phase) a macro block might be invoked at some specific time instants when none of its sub-blocks need invocation. In some embodiments of the invention, in order to have a finer grained representation of firing times, deterministic finite state automata may be used. An automaton representing firing times may be called a firing-time automaton.

Figure 17:
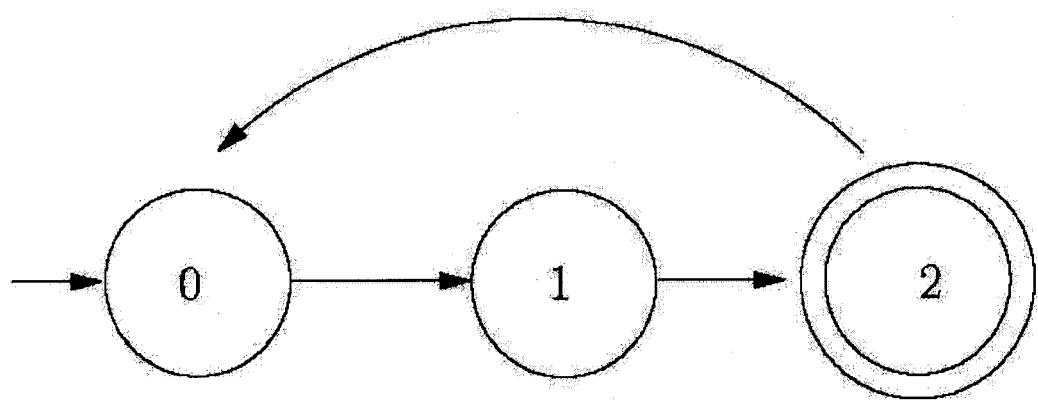
FIGS. 17 (a)-(f) illustrate automata representing firing times according to an embodiment of the invention.
Figure 17:
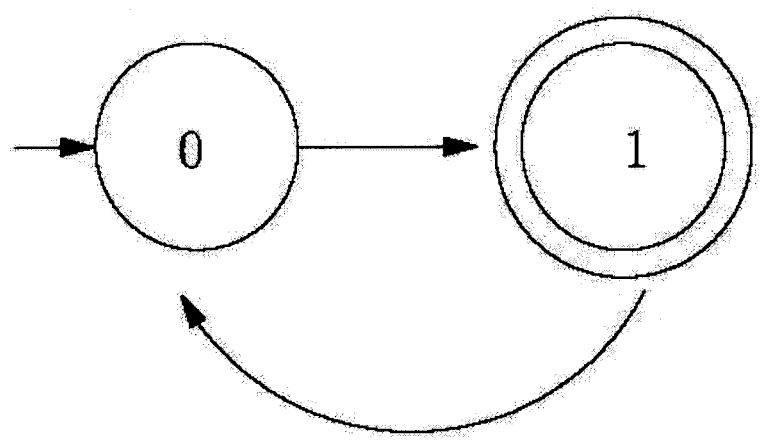
Figure 17:
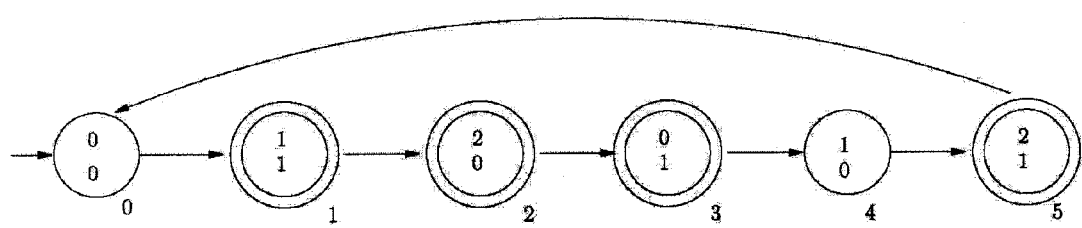
Figure 17:
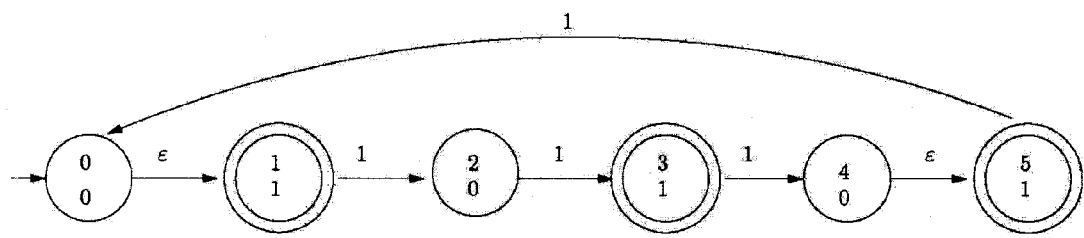
Figure 17:
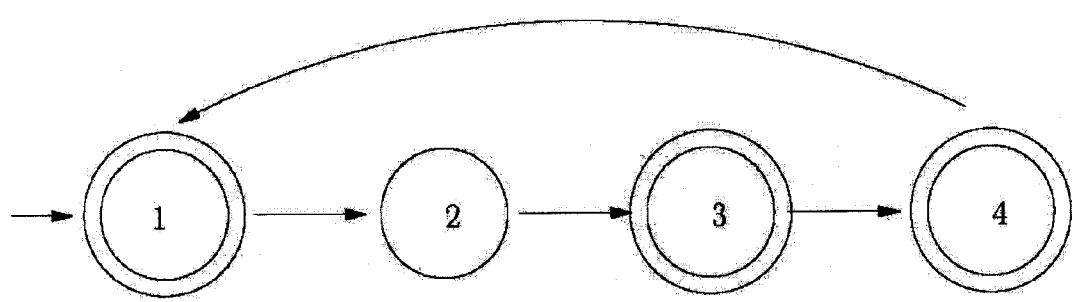
Figure 17:
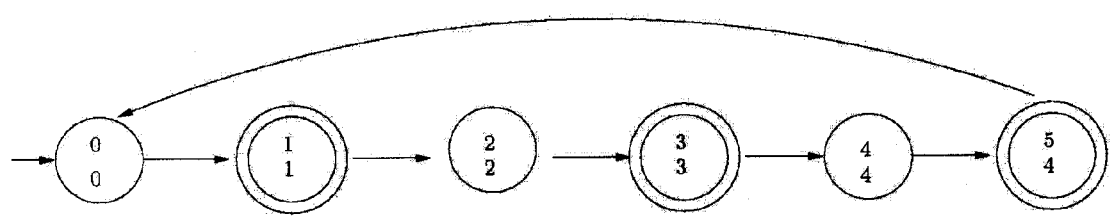

In FIGS. 17 (a) and (b) show two automata A and B representing firing times (3,2) and (2,1), respectively, according to an embodiment of the invention. The double circles represent accepting states of the automata, whereas single circles are non-accepting. A firing-time automaton A defines a language L(A) over $\{1\}^*$, where every transition is (implicitly) annotated with the symbol 1. Thus, for automata A and B of FIGS. 17(a) and (b), L(A)=$\{1^2, 1^5, 1^8,\}$ and L(B)=$\{1, 1^3, 1^5,\}$. Such a language L encodes a subset T of N, that is, a set of time instants, as follows:

$$T = \{n \in N | 1^n \in L\}$$

A firing-time automaton A is formally represented by the tuple ($S_A$, $s_0^A$, $F_A$, $T_A$) where $S_A$ is the set of states, $s_0^A \in S_A$ is the initial state, $F_A \subseteq S_A$ is the set of accepting states and $T_A \subseteq S_A \times S_A$ is the transition function (assumed to be deterministic). Given two automata A=($S_A$,$s_0^A$,$F_A$,$T_A$) and ($S_B$,$s_0^B$,$F_B$,$T_B$), the following operators are defined, according to an embodiment of the invention:

$$A \cup B = (S_A \times S_B, (s_0^A, s_0^B), \{(s_A, s_B) | s_A \in F_A \vee s_B \in F_B\}, T_{A \cup B})$$

$$T_{A \cup B} = \{(s_A, s_B) \to (s'_A, s'_B) | s_A \to s'_A \in T_A \wedge s_B \to s'_B \in T_B\}$$

$$A \odot B = (S_A \times S_B, (s_0^A, s_0^B), \{(s_A, s_B) | s_A \in F_A \wedge s_B \in F_B\}, T_{A \odot B})$$

$$T_{A \odot B} = \{(s_A, s_B) \to (s'_A, s'_B) | s_A \to s'_A \in T_A \wedge s_B \to s'_B \in T_B \wedge s_A \in F_A\} \cup$$
$$\{(s_A, s_B) \to (s'_A, s'_B) | s_A \to s'_A \in T_A \wedge s_A \notin F_A\}$$

All these definitions are algorithmic: they can be directly automated.

The operator $\cup$ computes the "union" of automata A and B so that L(A∪B)=L(A)∪L(B). This is illustrated in FIG. 17(c). It computes a firing-time automaton that captures the union of time instants captured by A and B. This operator is used to compute the firing-time automaton of a macro block, given the firing-time automata of its sub-blocks. The operator can be extended to more than two automata: for instance, for 3 automata A, B, C, their union A∪B∪C is defined as (A∪B)∪C. First we compute the union A∪B, and then the union (A∪B)∪C.

The operator $\odot$ captures the fact that a sub-block may only be triggered when its parent block is triggered. If A is the firing-time automaton of the parent and B the firing-time automaton for the child, then A⊙B represents the times that the child block will be triggered, assuming the parent is triggered as specified by A. The $\odot$ operator is illustrated in FIG. 17(f).

According to another embodiment of the invention, a "division" operator $\oslash$ is defined. This is the counterpart of the division $$\frac{(\pi', \theta')}{(\pi, \theta)}.$$

This operator is required in order to modify the firing-time automaton of a child, once the firing-time automaton of its parent is modified. This is done by "factoring-out" the firing times of the parent from the automaton of the child. Given automata A (for parent) and B (for child), B⊘A as an ε-automaton over $\{1\}^*$ defined as follows:

$$B \oslash A = (S_A \times S_B, (s_0^A, s_0^B), \{(s_A, s_B) | s_B \in F_B\}, T_{B \oslash A})$$

$$T_{B \oslash A} = \{(s_A, s_B) \xrightarrow{1} (s'_A, s'_B) | s_A \to s'_A \in T_A \wedge s_B \to s'_B \in T_B \wedge s_A \in F_A\} \cup$$
$$\{(s_A, s_B) \xrightarrow{\epsilon} (s'_A, s'_B) | s_A \to s'_A \in T_A \wedge s_B \to s'_B \in T_B \wedge s_A \notin F_A\}$$

ε-transitions can be removed with the usual minimization procedure.

Automata are identified with the equivalence class defined by the equivalence on the languages they accept: so two automata A and B are equivalent, denoted A≡B, iff L(A)=L(B) (the language of A is equal to the language of B).

The $\oslash$ operator is illustrated in FIG. 17(d). Automaton D is then minimized to obtain the equivalent automaton E shown in FIG. 17(e).

The $\odot$ and $\oslash$ operators are not commutative. Here are some other interesting properties of the above operators.

Theorem 2.1 For all deterministic firing-time automata A, B:

1. (A∪B) and (A⊙B) are also deterministic firing-time automata.
2. 0⊙A=A⊙0=0 and $\{1\}^* \odot A = A \odot \{1\}^* = A$.
3. 0⊘A=0 and A⊘$\{1\}^*$=A.
4. If L(A)⊇L(B) then $A \odot (B \oslash A) \equiv B$ 5. As a corollary, from the fact that L(A∪B)⊇L(B), we get:

$(A \cup B) \odot (B \oslash (A \cup B)) \equiv B$

In some embodiment, activity analysis is performed where firing time specifications are represented by (period, phase) pairs. For example, if ($\pi_A$, $\theta_A$) and ($\pi B$, $\theta B$) are the firing time specifications of A and B, respectively. A and B can be active at the same time if there exist non-negative integers m and n such that $$\theta_A + \pi_A \cdot m = \theta_B + \pi_B \cdot n.$$

Checking for the existence of m and n is the same as checking for the existence of a solution to the simple linear Diophantine equation. In this case this is equivalent to checking whether the difference $\theta=\theta_A-\theta_B$ is an integer multiple of the GCD $\pi$ of $\pi_A$ and $\pi_B$: if $\theta$ is a multiple of $\pi$ then a solution exists, otherwise no solution exists.

In some embodiments, activity analysis is performed where firing time specifications are represented by firing time automata. For example, if $M_A$ and $M_B$ are the firing time automata for blocks A and B, respectively. Activity analysis checks whether the intersection $L(M_A) \cap L(M_B)$ is empty. The procedure for doing this is the following. Let $F_A$ and $F_B$ be the sets of accepting states of $M_A$ and $M_B$, respectively. Let M be the firing time automaton $M_A \cap M_B$. A and B can be active at the same time iff M has a state $(s_A, s_B)$ such that:

$s_A \epsilon F_A$ and $s_B \epsilon F_B$, and $(s_A, s_B)$ is reachable from the initial state of M: this means there is a path starting at the initial state of M and following the transitions of M until it reaches state $(s_A, s_B)$.

Compute the Firing Time Specification of the Macro Block P

In one embodiment, let $FTS_1, \ldots, FTS_k$ be the firing time specifications of all sub-blocks of P. The firing time specification FTS of P can be calculated as follows:

If $FTS_i$ are represented as (period, phase) pairs, then $FTS=GGCD(FTS_1, \ldots, FTS_k)$, where GGCD is the generalized GCD operator.
If $FTS_i$ are represented as firing time automata, then $FTS=FTS_1 \cup \ldots \cup FTS_k$, (period, phase) pairs can also be translated into firing time automata as illustrated in FIGS. 26(a) and 26(b). This means that even if FTSi are represented as (period, phase) pairs FTS can still be represented as a firing time automaton. In one embodiment, once the FTS for P is computed, the FTSi for all sub-blocks of P are updated as follows:

If $FTS_i$ are represented as (period, phase) pairs, then $$FTS'_i = \frac{FTS_i}{FTS},$$

If $FTS_i$ are represented as firing time automata, then:

$FTS'_i = \min(FTS_1 \oslash FTS)$, where min denotes the standard automata minimization procedure that removes $\epsilon$ transitions. Notice that from Theorem 2.1 it follows that $FTS_i \equiv FTS \odot FTS'_i$.

In some embodiments, $FTS'_i$ represents the factored firing time specifications.

Associating Modulo Counters to Factored Firing Time Specifications

Every factored firing time specification $FTS'_i$, which is greater than 1 is implemented by a persistent integer variable $c_i$ functioning as a modulo counter. This counter is modulo the period of FTS'i: if $FTS'_i$ is represented as a firing time automaton its period is equal to the length of the (unique) cycle of the automaton. A counter ci can be in one or more accepting states. For a counter implementing a (period, phase) pair there is a single accepting state corresponding to the initial phase value. For a counter implementing a firing time automaton, there are as many accepting states as the accepting states of the automaton.

Once the previous steps have been completed, code is generated, according to one of the methods used for code generation from untimed diagrams. The only difference when generating code from timed diagrams is that the activity of each sub-block, determined by its factored firing time specification, needs to be taken into account before calling the interface functions of the sub-block. Therefore, in some embodiments, generating code may follow any of the methods for timed diagrams: The call to any interface function A.f( ) of any sub-block A is guarded by a conditional if-statement that checks whether the modulo counter implementing the factored firing time specification of A is in one of its accepting states. At every cycle, the modulo counter for A is incremented after the last interface function of A has been called. In static code generation methods such as the step-get method and the per-port method the last interface function that is called for each block can be determined statically. In the dynamic code generation method the last interface function can be determined by assigning another counter which is initialized at every cycle to $N_A$, the total number of interface functions for A, and decremented every time a function for A is called. When the counter reaches 0 the last function has been called.

The modulo counters are initialized to zero by the init( ) method of the block. For blocks that have a phase greater than one, init( ) also initializes their outputs to initial values specified by the user, as in the case of triggered blocks.

Figure 18:
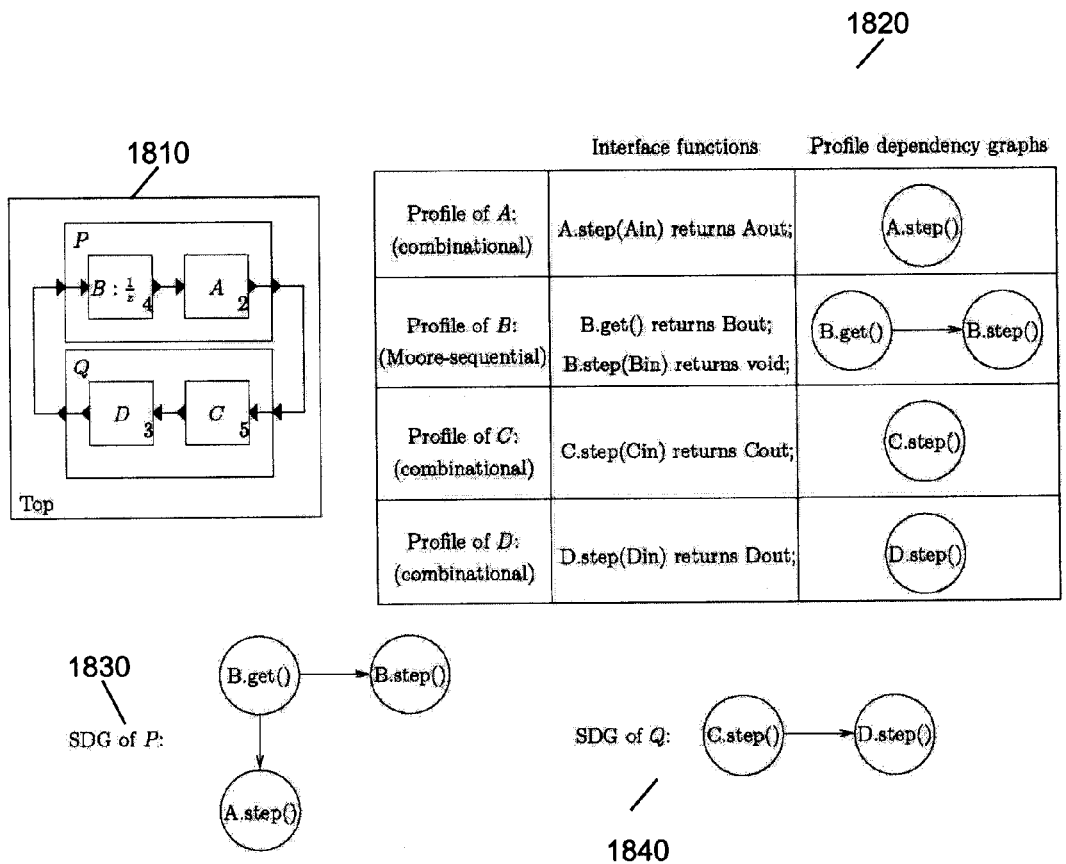
FIG. 18 illustrates a hierarchical timed block diagram, profiles of its atomic blocks and SDG's for macro blocks P and Q according to an embodiment of the invention.

FIG. 18 illustrates a hierarchical timed diagram 1810, profiles of it atomic blocks 1820 and SDG's for macro blocks P 1830 and Q 1840 according to an embodiment of the invention. Block B is assumed to be a Moore-sequential block, the other blocks are assumed to be combinational. In this example firing time specifications are represented by periods only, and all initial phases are assumed to be zero.

In some embodiments, the activity analysis portion determines that blocks A and B may be active at the same time, and so can blocks C and D. Therefore, the dependency analysis process builds the same SDGs for P and Q as in the untimed diagram case. These are shown by SDG P 1830 and SDG Q 1840.

With the activity analysis and dependency analysis information, the Code Generation step is initiated by performing the following: compute the FTS of P as the GGCD of 2 and 4: this is equal to 2; compute the FTS of Q as the GGCD of 3 and 5: this is equal to 1; compute the factored FTS of A: this is equal to 2/2=1; compute the factored FTS of B: this is equal to 4/2=2; compute the factored FTS of C: this is equal to 5/1=5; compute the factored FTS of D: this is equal to 3/1=3; and assign a modulo-2 counter $c_B$ to B. A does not need a modulo counter since its factored FTS is 1; a modulo-5 counter $c_C$ is assigned to C and a modulo-3 counter $C_D$ is assigned to D. In one embodiment, the code generated using the step-get method for P and Q is shown below:

```
Q.init( ) {
c_C:=0;
c_D:=0;
}
Q.step(Q_in) returns Q_out {
if (c_C=0) then
    C_out:=C.step(Q_in);
end if;
c_C:=(c_C+1) mod 5;
if (c_D=0) then
    Q_out:=D.step(C_out);
end if;
c_D:=(c_D+1) mod 3;
return Q_out;
{
P.init( ) {
c_B:=0;
}
```

```
P.step(P_in) {
  if (c_B=0) then
    B.step(P_in);
  end if;
  c_B:=(c_B+1) mod 2; // c_B updated because B.step( ) is
    called last
}
P.get( ) {
  if (c_B=0) then
    B_out:=B.get( );
  end if;
  // c_B not updated because B.step( ) is still to be called
  P_out:=A.step(B_out);
  return P_out;
}
```

Then the process continues by performing the steps of: compute the FTS of Top as the GGCD of 2 and 1: this is equal to 1; compute the factored FTS of P: this is equal to 2/1=2; compute the factored FTS of Q: this is equal to 1/1=1; and assign a modulo-2 counter to P. In some embodiments, no modulo counter to Q is assigned, since its FTS is 1. In one embodiment, the code generated using the step-get method for Top is shown below:

```
Top.init( ) {
  P.init( );
  c_P:=0;
  Q.init( );
}
Top.step( ) {
  if (c_P=0) then
    P_out:=P.get( );
  end if;
  Q_out:=Q.step(P_out);
  if (c_P=0) then
    P.step(Q_out);
  end if;
  c_P:=(c_P+1) mod 2;
}
```

Other code generation methods may be used.

Figure 20:
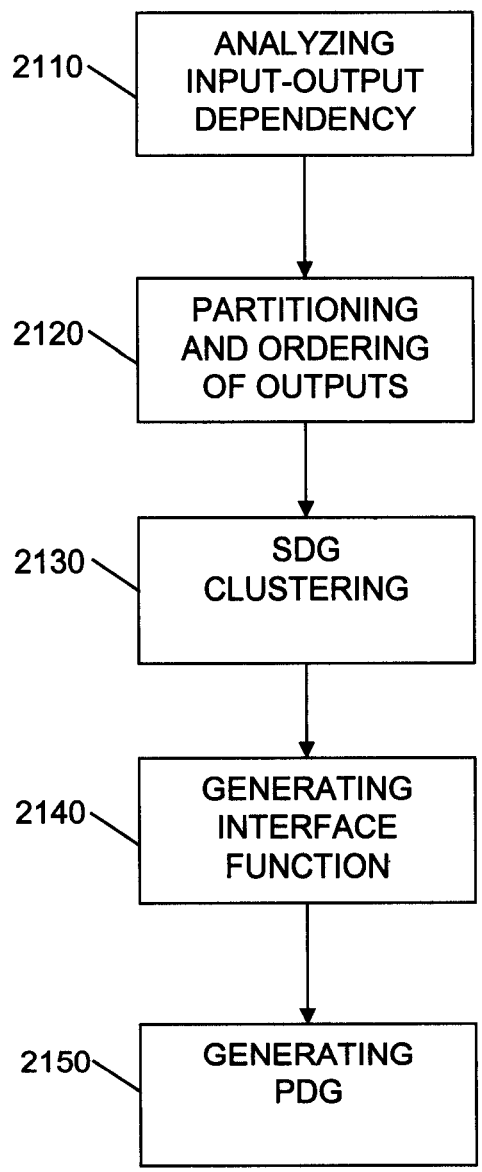
FIG. 20 depicts a flow diagram illustrating the processes that is performed by code generation according to an embodiment of the invention.

FIG. 20 depicts a flow diagram illustrating the processes that may be performed by code generation, in addition to Classification, Dependency Analysis and Activity Analysis shown in FIGS. 1, 2, and 15. Code generation may perform a plurality of actions and/or processes. These actions and/or processes may be performed in any order and may also be optional depending on type of code generation. In some embodiments, the code generation includes analyzing input-output dependency of the blocks 2110, partitioning and ordering of the outputs 2120, SDG clustering 2130, generating interface functions 2140, and generating PDG 2150.

At 2110, an input-output dependency analysis is performed. In some embodiments the dependencies of each output port with respect to any input ports are determined. In some embodiments this can be done by analyzing the SDG to find dependency paths from inputs to outputs. In some embodiments the result of this analysis is represented as a BIODG.

At 2120, the output partitioning and ordering is performed. In some embodiments, the set of output ports is partitioned in a number of classes, where all outputs in the same class depend in exactly the same set of inputs. In other embodiments other partitioning methods may be used. In some embodiments, the classes are ordered with respect to some relation. One such relation may be the subset relation of the inputs they depend upon.

At 2130, SDG clustering is performed. In some embodiments, the SDG of the block is split in two sub-graphs. In other embodiments, the SDG is split in more sub-graphs. In some embodiments, the sub-graphs are disjoint, that is, the same node cannot be included in two sub-graphs. In other embodiments, the sub-graphs are not disjoint, that is, the same node may be included in more than one sub-graphs. In some embodiments, the sub-graphs cover the SDG, that is every node of the SDG belongs to at least one sub-graph. In other embodiments, the sub-graphs do not cover the SDG, that is, some nodes may not be included in any sub-graph. In some embodiments, the information from the Input-output Dependency Analysis and Output Partitioning and Ordering steps may be used to group the SDG into clusters. Other embodiments to group the SDG into clusters may be used as desired.

At 2140, Interface function generation is performed. The interface functions for the blocks are generated. In some embodiments, the sub-graphs produced by the SDG clustering step may be used to generate the interface functions. In some embodiments, one interface function for each sub-graph is generated. In some embodiments a topological sort of the sub-graphs is performed to produce the order in which the corresponding interface function calls the nodes of the sub-graph. In some embodiments, the calls to these nodes may be placed within conditional if-statements, guarded by specific flags or any other internal variables. Any desired process to generate these functions may be used.

At 2150, profile dependency graph (PDG) generation is performed. In some embodiments, the PDG contains one node for each interface function generated by the previous step. In other embodiments, the PDG may contain a different number of nodes. In some embodiment, a dependency between two nodes of the SDG is added if and only if a dependency between two nodes of the corresponding sub-graphs exists in the SDG. In other embodiments other types of dependencies may be added. Other generation processes may also be utilized.

The embodiments can be used for any type of design activities, including hardware design, software design, and designs including both hardware and software such as hardware/software co-design activities. For example, some embodiments of the invention can be applied to the design of embedded software and systems, which includes communication systems such as encoders/decoders, automotive control systems such as ABS or cruise controllers, avionic controllers, as well as any other systems that includes embedded software.

Figure 21:
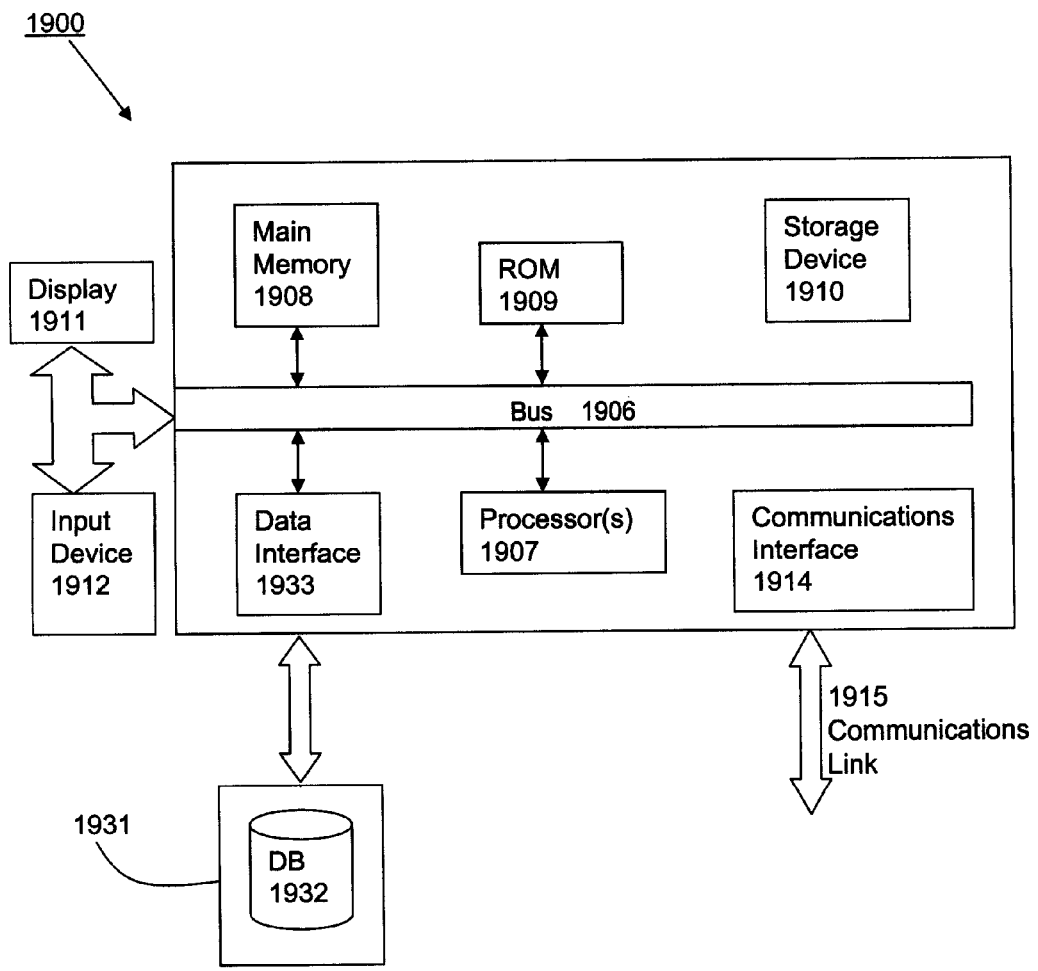
FIG. 21 depicts a computerized system on which a method for code generation may be implemented.

FIG. 21 depicts a computerized system on which a method for verification based on rules and models can be implemented. The execution of the sequences of instructions required to practice the embodiments may be performed by a computer system 1900 as shown in FIG. 21. In an embodiment, execution of the sequences of instructions is performed by a single computer system 1900. According to other embodiments, two or more computer systems 1900 coupled by a communication link 1915 may perform the sequence of instructions in coordination with one another. Although a description of only one computer system 1900 will be presented below, however, it should be understood that any number of computer systems 1900 may be employed to practice the embodiments.

A computer system 1900 according to an embodiment will now be described with reference to FIG. 21, which is a block diagram of the functional components of a computer system 1900. As used herein, the term computer system 1900 is broadly used to describe any computing device that can store and independently run one or more programs.

Each computer system 1900 may include a communication interface 1914 coupled to the bus 1906. The communication interface 1914 provides two-way communication between computer systems 1900. The communication interface 1914 of a respective computer system 1900 transmits and receives electrical, electromagnetic or optical signals, which include data streams representing various types of signal information, e.g., instructions, messages and data. A communication link 1915 links one computer system 1900 with another computer system 1900. For example, the communication link 1915 may be a LAN, in which case the communication interface 1914 may be a LAN card, or the communication link 1915 may be a PSTN, in which case the communication interface 1914 may be an integrated services digital network (ISDN) card or a modem, or the communication link 1915 may be the Internet, in which case the communication interface 1914 may be a dial-up, cable or wireless modem.

A computer system 1900 may transmit and receive messages, data, and instructions, including program, i.e., application, code, through its respective communication link 1915 and communication interface 1914. Received program code may be executed by the respective processor(s) 1907 as it is received, and/or stored in the storage device 1910, or other associated non-volatile media, for later execution.

In an embodiment, the computer system 1900 operates in conjunction with a data storage system 1931, e.g., a datastorage system 1931 that contain a database 1932 that is readily accessible by the computer system 1900. The computer system 1900 communicates with the data storage system 1931 through a data interface 1933. A data interface 1933, which is coupled to the bus 1906, transmits and receives electrical, electromagnetic or optical signals, which include data streams representing various types of signal information, e.g., instructions, messages and data. In embodiments, the functions of the data interface 1933 may be performed by the communication interface 1914.

Computer system 1900 includes a bus 1906 or other communication mechanism for communicating instructions, messages and data, collectively, information, and one or more processors 1907 coupled with the bus 1906 for processing information. Computer system 1900 also includes a main memory 1908, such as a random access memory (RAM) or other dynamic storage device, coupled to the bus 1906 for storing dynamic data and instructions to be executed by the processor(s) 1907. The main memory 1908 also may be used for storing temporary data, i.e., variables, or other intermediate information during execution of instructions by the processor(s) 1907.

The computer system 1900 may further include a read only memory (ROM) 1909 or other static storage device coupled to the bus 1906 for storing static data and instructions for the processor(s) 1907. A storage device 1910, such as a magnetic disk or optical disk, may also be provided and coupled to the bus 806 for storing data and instructions for the processor(s) 1907.

A computer system 1900 may be coupled via the bus 1906 to a display device 1911, such as, but not limited to, a cathode ray tube (CRT), for displaying information to a user. An input device 1912, e.g., alphanumeric and other keys, is coupled to the bus 1906 for communicating information and command selections to the processor(s) 1907.

According to one embodiment, an individual computer system 1900 performs specific operations by their respective processor(s) 1907 executing one or more sequences of one or more instructions contained in the main memory 1908. Such instructions may be read into the main memory 1908 from another computer-usable medium, such as the ROM 1909 or the storage device 1910. Execution of the sequences of instructions contained in the main memory 1908 causes the processor(s) 1907 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 1907. Such a medium may take many forms, including, but not limited to, non-volatile, volatile and transmission media. Non-volatile media, i.e., media that can retain information in the absence of power, includes the ROM 1909, CD ROM, magnetic tape, and magnetic discs. Volatile media, i.e., media that cannot retain information in the absence of power, includes the main memory 1908. Transmission media includes coaxial cables, copper wire and fiber optics, including the wires that comprise the bus 1906. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than in a restrictive sense.

What is claimed is:

1. A method for modular code generation comprising:
using at least a processor to perform a process, the process comprising:
providing blocks from a block diagram and one or more profiles of a first block of the blocks;
analyzing dependency, which is indicative of how the blocks are related to each other in the block diagram, by using the one or more profiles and by following at least one path from an output of the first block to one or more triggers and/or one or more inputs of the first block of the blocks, wherein
the one or more profiles, rather than the block diagram, provide information for analyzing the dependency, and
the one or more profiles include information related to an interface of the first block;
connecting a portion of the one or more profiles of the first block to corresponding portions of a plurality of profiles of one or more other blocks of the blocks based at least in part upon the dependency; and
generating code for the blocks that are analyzed, wherein the code for the first block of the blocks is generated independently of a context in which the first block is used or located in the block diagram while dependency relationships are preserved in the code.

2. The method of claim 1, further comprising generating a Profile Dependency Graph (PDG) for each block.

3. The method of claim 1, wherein analyzing the dependency of the blocks further comprises:
generating a scheduling dependency graph (SDG); and
determining whether the SDG is cyclic or acyclic.

4. The method of claim 3, further comprising:
  determining dependencies between input ports and output ports of the blocks;
  generating a bipartite input output dependency graph;
  partitioning the output ports into classes with respect to their dependencies upon input ports; and
  ordering the classes with respect to a partial order.

5. The method of claim 4, wherein generation code further comprises clustering the SDG into a number of sub-graphs.

6. The method of claim 5, wherein clustering is performed according to at least one of step-get, per-port and dynamic functions.

7. The method of claim 1, further comprising classifying the blocks.

8. The method of claim 7, wherein classification of the blocks comprises:
  automatically determining whether the blocks are Moore-sequential, non-Moore-sequential, combinational; or
  classifying each output port of the blocks.

9. The method of claim 1, further comprising a procedure to eliminate at least one trigger from a block in block diagrams by propagating the at least one trigger in an internal diagram of the block, wherein at least one of the at least one trigger comprises a signal for a block in the block diagrams.

10. The method of claim 1, further comprising translating between two timed block diagram notations.

11. The method of claim 10, further comprising representing times where a block is to be fired by (period,phase) pairs or by finite state automata.

12. The method of claim 11, further comprising procedures to multiply and divide automata that represent firing times, and to compute factored firing times of sub-blocks.

13. The method of claim 10, further comprising computing firing times for a macro-block, by composing one or more automata of its sub-blocks.

14. The method of claim 13, further comprising procedures to multiply and divide automata that represent firing times, and to compute factored firing times of sub-blocks.

15. A computer program product comprising a non-transitory computer readable medium having stored thereupon a sequence of instructions which, when executed by a processor, cause the processor to perform a process for modular code generation, the process comprising:
  providing blocks from a block diagram and one or more profiles of a first block of the blocks;
  analyzing dependency, which is indicative of how the blocks are related to each other in the block diagram, by using the one or more profiles and by following at least one path from an output of the first block to one or more triggers and/or one or more inputs of the first block of the blocks, wherein
    the one or more profiles, rather than the block diagram, provide information for analyzing the dependency, and
    the one or more profiles include information related to an interface of the first block;
  connecting a portion of the one or more profiles of the first block to corresponding portions of a plurality of profiles of one or more other blocks of the blocks based at least in part upon the dependency; and
  generating code for the blocks that are analyzed, wherein
    the code for the first block of the blocks is generated independently of a context in which the first block is used or located in the block diagram while dependency relationships are preserved in the code.

16. The computer program product of claim 15, the act of analyzing the dependency of the blocks comprises:
  generating a scheduling dependency graph (SDG); and
  determining whether the SDG is cyclic or acyclic.

17. The computer program product of claim 16, the process further comprises:
  determining dependencies between input ports and output ports of the blocks;
  generating a bipartite input output dependency graph;
  partitioning the output ports into classes with respect to their dependencies upon input ports; and
  ordering the classes with respect to a partial order.

18. The computer program product of claim 15, the process further comprises:
  classifying the blocks, wherein the act of classifying the blocks comprises:
    automatically determining whether the blocks are Moore-sequential, non-Moore-sequential, combinational; or
    classifying each output port of the blocks.

19. A system for modular code generation, comprising:
  at least one processor that is to:
  provide blocks from a block diagram and one or more profiles of each block;
  analyze the dependency, which is indicative of how the blocks are related to each other in the block diagram, by using the one or more profiles and by following at least one path from an output of the first block to one or more triggers and/or one or more inputs of the first block of the blocks, wherein
    the one or more profiles, rather than the block diagram, provide information for analyzing the dependency, and
    the one or more profiles include information related to an interface of the first block;
  connect a portion of the one or more profiles of the first block to corresponding portions of a plurality of profiles of one or more other blocks of the blocks based at least in part upon the dependency; and
  generate code for the blocks that are analyzed, wherein
    the code for the first block of the blocks is generated independently of a context in which the first block is used or located in the block diagram while dependency relationships are preserved in the code.

20. The system of claim 19, the at least one processor that is to analyze the dependency of the blocks is further to:
  generate a scheduling dependency graph (SDG); and
  determine whether the SDG is cyclic or acyclic.

21. The system of claim 20, the at least one processor is further to:
  determine dependencies between input ports and output ports of the blocks;
  generate a bipartite input output dependency graph;
  partition the output ports into classes with respect to their dependencies upon input ports; and
  order the classes with respect to a partial order.

22. The system of claim 19, wherein the at least one processor is further to:
  classify the blocks, wherein the at least one processor that is to classify the blocks is further to:
    automatically determine whether the blocks are Moore-sequential, non-Moore-sequential, combinational; or
    classify each output port of the blocks.

* * * * *